US012726618B2

(12) United States Patent
Wang

(10) Patent No.: US 12,726,618 B2
(45) Date of Patent: Sep. 1, 2026

(54) MULTIMEDIA DATA PROCESSING METHOD AND APPARATUS, DEVICE, STORAGE MEDIUM, AND PROGRAM PRODUCT

(71) Applicant: TENCENT TECHNOLOGY (SHENZHEN) COMPANY LIMITED, Shenzhen (CN)

(72) Inventor: Liqiang Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 18/925,857

(22) Filed: Oct. 24, 2024

(65) Prior Publication Data

US 2025/0055990 A1 Feb. 13, 2025

Related U.S. Application Data

(63) Continuation of application No. PCT/CN2023/106277, filed on Jul. 7, 2023.

(30) Foreign Application Priority Data

Sep. 19, 2022 (CN) ......................... 202211138569.5

(51) Int. Cl.
*H04N 19/117* (2014.01)
*H04N 19/176* (2014.01)
*H04N 19/80* (2014.01)

(52) U.S. Cl.
CPC ......... *H04N 19/117* (2014.11); *H04N 19/176* (2014.11); *H04N 19/80* (2014.11)

(58) Field of Classification Search
CPC .. H04N 19/117; H04N 19/119; H04N 19/176; H04N 19/186; H04N 19/42;
(Continued)

(56) References Cited

U.S. PATENT DOCUMENTS

| | | | | |
|---|---|---|---|---|
| 7,630,435 B2 * | 12/2009 | Chen | H04N 19/46 | 375/240.03 |
| 8,149,909 B1 * | 4/2012 | Garbacea | H04N 19/176 | 375/240.03 |

(Continued)

FOREIGN PATENT DOCUMENTS

| | | |
|---|---|---|
| CN | 113709504 A | 11/2021 |
| CN | 114157869 A | 3/2022 |
| JP | 2020-198463 A | 12/2020 |

OTHER PUBLICATIONS

Liqiang Wang, et al., "EE1-1.4; Neural network based in-loop filter with 2 models", (JVET-AA0087-v3), Joint Video Experts Team (JVET) of ITU-T SG 16 WP 3 and ISO/IEC JTC 1/SC 29 27th Meeting, by teleconference, Jul. 13-22, 2022, pp. 1-8.

(Continued)

*Primary Examiner* — Asmamaw G Tarko
(74) *Attorney, Agent, or Firm* — Sughrue Mion, PLLC

(57) ABSTRACT

A multimedia data processing method, executed by a computer device, includes: determining a first associated image block associated with a target image block to be filtered in multimedia data; acquiring target coding and decoding information associated with the target image block; and filtering the target image block by an image filter based on a neural network according to the first associated image block and the target coding and decoding information to obtain a filtered image block corresponding to the target image block.

18 Claims, 12 Drawing Sheets

(58) Field of Classification Search

CPC ........ H04N 19/80; H04N 19/82; H04N 19/86; G06N 3/0495; G06N 3/0464; G06T 5/70

USPC ....................................................... 375/240.2

See application file for complete search history.

(56) References Cited

U.S. PATENT DOCUMENTS

| | | | | |
|---|---|---|---|---|
| 11,265,540 | B2 * | 3/2022 | Na | H04N 19/117 |
| 11,792,438 | B2 * | 10/2023 | Li | G06N 3/045<br>375/240.12 |
| 12,126,799 | B2 * | 10/2024 | Galpin | H04N 19/86 |
| 2013/0188689 | A1 * | 7/2013 | Garbacea | H04N 19/176<br>375/240.03 |
| 2019/0045224 | A1 * | 2/2019 | Huang | H04N 19/147 |
| 2021/0021823 | A1 * | 1/2021 | Na | H04N 19/124 |
| 2021/0037251 | A1 * | 2/2021 | Zhang | H04N 19/44 |
| 2021/0409685 | A1 * | 12/2021 | Gao | H04N 19/46 |
| 2022/0109890 | A1 * | 4/2022 | Li | G06N 3/09 |
| 2022/0215593 | A1 | 7/2022 | Wang et al. | |
| 2023/0385643 | A1 * | 11/2023 | Rahman | G06N 3/082 |

OTHER PUBLICATIONS

International Search Report for PCT/CN2023/106277 dated Nov. 6, 2023.

Written Opinion for PCT/CN2023/106277 dated Nov. 6, 2023.

Communication issued Oct. 7, 2025 in JP Application No. 2024-563485.

* cited by examiner

MULTIMEDIA DATA PROCESSING METHOD AND APPARATUS, DEVICE, STORAGE MEDIUM, AND PROGRAM PRODUCT

CROSS-REFERENCE TO RELATED APPLICATIONS

This application is a continuation application of International Application No. PCT/CN2023/106277 filed on Jul. 7, 2023, which claims priority to Chinese Patent Application No. 202211138569.5, filed with the China National Intellectual Property Administration on Sep. 19, 2022, the disclosures of each being incorporated by reference herein in their entireties.

FIELD

The disclosure relates to the technical field of multimedia, and in particular, to a multimedia data processing method and apparatus, a device, a storage medium, and a program product.

BACKGROUND

During processing of multimedia data, a coding device performs coding, transform, and quantization operations on an original image to obtain a coded image, and the coded image may be subjected to inverse quantization, inverse transform, and predictive compensation operations to acquire a reconstructed image. Compared with the original image, some information of the reconstructed image is different from that of the original image due to influences of quantization, resulting in a distortion of the reconstructed image. Therefore, the reconstructed image may be filtered to reduce a distortion degree of the reconstructed image. In practice, accuracy of filtering modes of an image may be relatively low, resulting in a poor filtering effects.

SUMMARY

Provided are a multimedia data processing method and apparatus, a device, a storage medium, and a program product, capable of increasing filtering accuracy of images and improving a filtering effect of the images.

According to some embodiments, a multimedia data processing method, executed by a computer device, includes: determining a first associated image block associated with a target image block to be filtered in multimedia data; acquiring target coding and decoding information associated with the target image block; and filtering the target image block by an image filter based on a neural network according to the first associated image block and the target coding and decoding information to obtain a filtered image block corresponding to the target image block.

According to some embodiments, a multimedia data processing apparatus includes: at least one memory configured to store computer program code; and at least one processor configured to read the program code and operate as instructed by the program code, the program code including: determination code configured to cause at least one of the at least one processor to determine a first associated image block associated with a target image block to be filtered in multimedia data; acquisition code configured to cause at least one of the at least one processor to acquire target coding and decoding information of the first associated image block associated with the target image block; and first filtering code configured to cause at least one of the at least one processor to filter the target image block by an image filter based on a neural network according to the first associated image block and the target coding and decoding information to obtain a filtered image block corresponding to the target image block.

According to some embodiments, a non-transitory computer-readable storage medium, storing computer code which, when executed by at least one processor, causes the at least one processor to at least: determine a first associated image block associated with a target image block to be filtered in multimedia data; acquire target coding and decoding information of the first associated image block associated with the target image block; and filter the target image block by an image filter based on a neural network according to the first associated image block and the target coding and decoding information to obtain a filtered image block corresponding to the target image block.

BRIEF DESCRIPTION OF THE DRAWINGS

To describe the technical solutions of some embodiments of this disclosure more clearly, the following briefly introduces the accompanying drawings for describing some embodiments. The accompanying drawings in the following description show only some embodiments of the disclosure, and a person of ordinary skill in the art may still derive other drawings from these accompanying drawings without creative efforts. In addition, one of ordinary skill would understand that aspects of some embodiments may be combined together or implemented alone.

DESCRIPTION OF EMBODIMENTS

To make the objectives, technical solutions, and advantages of the present disclosure clearer, the following further describes the present disclosure in detail with reference to the accompanying drawings. The described embodiments are not to be construed as a limitation to the present disclosure. All other embodiments obtained by a person of ordinary skill in the art without creative efforts shall fall within the protection scope of the present disclosure.

In the following descriptions, related "some embodiments" describe a subset of all possible embodiments. However, it may be understood that the "some embodiments" may be the same subset or different subsets of all the possible embodiments, and may be combined with each other without conflict. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. For example, the phrase "at least one of A, B, and C" includes within its scope "only A", "only B", "only C", "A and B", "B and C", "A and C" and "all of A, B, and C."

Figure 1:
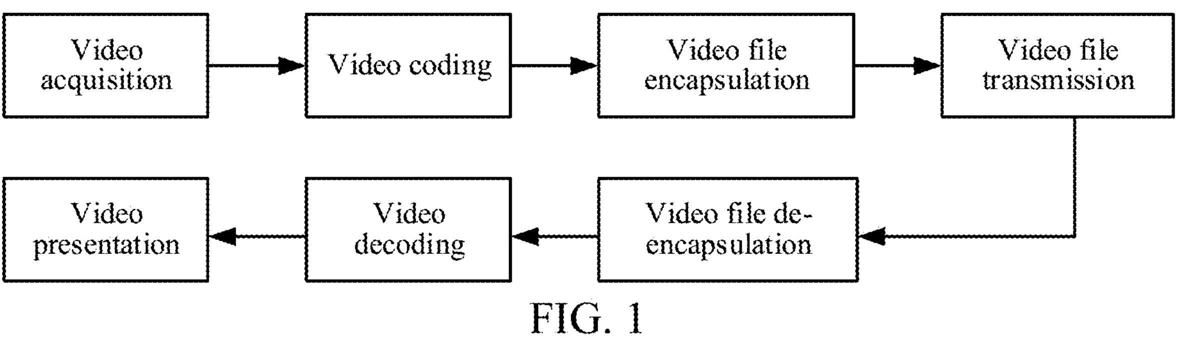
FIG. 1 is a flowchart of video processing according to some embodiments.

Some embodiments relate to the processing technology of multimedia data. The multimedia data (or called media data) refers to composite data formed by media data such as texts, graphics, images, voices, animations, and moving images that are related to each other in content. The multimedia data mentioned in some embodiments includes image data composed of images, or video data composed of images, voices, and the like. The process for processing multimedia data involved in some embodiments includes media data acquisition, media data coding, media data file encapsulation, media data file transmission, media data decoding, and final data presentation. Based on the multimedia data being video data, the process for processing the video data may be shown in FIG. 1 and may include: video acquisition, video coding, video file encapsulation, video transmission, video file de-encapsulation, video decoding, and final video presentation.

Figure 2:
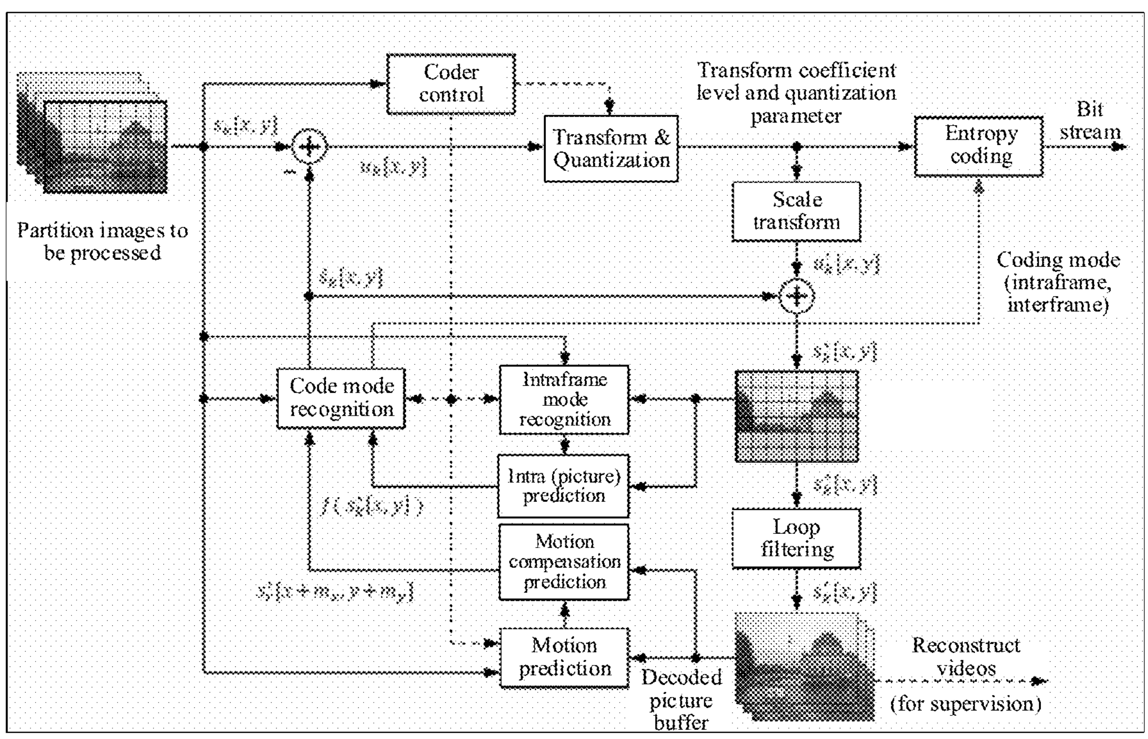
FIG. 2 is a schematic flowchart of a processing method for multimedia data according to some embodiments.

The video acquisition is configured for converting an analog video into a digital video and saving the digital video in the format of a digital video file. For example, the video acquisition may convert a video signal into binary digital information, where the binary information converted from the video signal is a binary data stream, and the binary information can also be referred to as a code stream or a bitstream of the video signal. The video coding refers to the conversion of a file in an original video format into a file in another video format through a compression technology. The generation of the video media content mentioned in some embodiments includes real scenes generated by camera acquisition and screen content scenes generated by a computer. From the perspective of the mode of acquiring video signals, video signals may be shot by a camera or generated by a computer. Due to different statistical characteristics, corresponding compression coding modes may also be different. In video coding technologies, taking the international video coding standard high efficiency video coding (HEVC)/H.265, the international video coding standard versatile video coding (VVC)/H.266, and the Chinese national video coding standard audio video coding standard (AVS) or AVS3 (the third generation video coding standard launched by the AVS standard group) as examples, a hybrid coding framework is used to perform a series of the following operations and processes on an inputted original video signal, as shown in FIG. 2. (1) Block partition structure: a multimedia data frame (such as a video frame in video data) is inputted and is partitioned into a plurality of non-overlapping processing units according to the size of a block, and each processing unit performs a similar compression operation. In some embodiments, the processing unit is called a coding tree unit (CTU) or a largest coding unit (LCU). The CTU may be more finely partitioned to obtain one or a plurality of basic coding units, each of which is called a coding unit (CU). Each CU is the most basic element in a coding process. In some embodiments, the processing unit may also be called a tile (a rectangular region of a multimedia data frame capable of decoding and coding independently). The tile may be further finely partitioned to obtain one or a plurality of superblocks (SB, where the SB is a starting point for block partition and may be further partitioned into a plurality of subblocks), and the SB may be further partitioned to obtain one or a plurality of image blocks (B). Each image block is the most basic element in a coding process.

Figure 3:
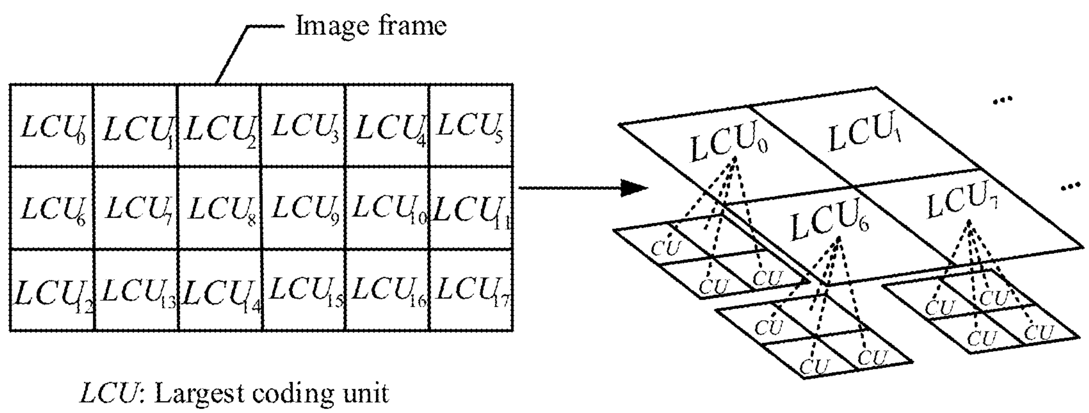
FIG. 3 is a schematic diagram of partitioning an image frame into blocks according to some embodiments.

The relationship between the LCU (or CTU) and the CU can be shown in FIG. 3. From FIG. 3, it can be seen that an image frame in multimedia data includes one or a plurality of LCUs, and one LCU includes at least two CUs. In the coding process of multimedia data, if a coding device partitions image frames in the multimedia data into blocks, in some embodiments, one image block may refer to the LCU or CU in one frame of image in the multimedia data. In the coding process of multimedia data, if the coding device does not partition image frames in the multimedia data into blocks, in some embodiments, one image block may refer to one frame of image in the multimedia data. (2) Predictive coding: The predictive coding includes an intra (picture) prediction mode and an inter (picture) prediction mode. Based on an original video signal being predicted by a selected coded video signal, a residual video signal is obtained. A coding side may determine the predictive coding mode from many options for the current coded image block (for example the image block to be decoded) and inform a decoding side.

a. Intra (picture) prediction: Predicted signals are derived from regions which are coded and reconstructed in a same image.

b. Inter (picture) prediction: Predicted signals are derived from other images (called reference images) that have been coded and are different from the current image.

(3) Transform & Quantization: Based on discrete Fourier transform (DFT), discrete cosine transform (DCT) and other transform operations, the residual video signal is converted into a transform domain, which is called a transform coefficient. The DCT is a subset of the DFT, a lossy quantization operation is further performed on the signal in the transform domain, and information may be lost, so that the quantized signal may be used for compression expression.

In some video coding standards, there may be more than one transform mode, therefore, the coding side may select one of the transform modes for the current coded image block, and inform the decoding side. The fineness of quantization may be determined by a quantization parameter (QP). When the value of the QP is larger, it indicates that coefficients with a larger value range will be quantized into the same output, which may bring a greater distortion and a lower bit rate. On the contrary, when the value of the QP is smaller, it indicates that coefficients with a smaller value range will be quantized into the same output, which may bring a smaller distortion and a higher bit rate.

(4) Entropy coding or statistical coding: The quantized transform domain signal will be statistically compressed and coded according to the frequency of occurrence of each value, and finally, a binary (0 or 1) compressed code stream will be outputted. Furthermore, for other information generated by coding, such as a selected mode or a motion vector, the entropy coding may reduce the bit rate.

The statistical coding is a lossless coding mode which may reduce the bit rate for expressing a same signal. Statistical coding modes may include variable length coding (VLC) and content adaptive binary arithmetic coding (CABAC).

(5) Loop filtering: Based on the operations of inverse quantization, inverse transform and predictive compensation (reverse operations of the foregoing (2) to (4)) on the coded image (for example the multimedia data frame), a reconstructed decoded image can be obtained. Compared with an original image, some information of the reconstructed image is different from that of the original image due to the influence of quantization, resulting in a distortion. The reconstructed image is subjected to a filtering operation, such as deblocking, sample adaptive offset (SAO) or adaptive loop filter (ALF), so that the distortion degree caused by quantization may be reduced. Because these filtered reconstructed images may be used as a reference for coded images to predict future signals, the foregoing filtering operation may be called loop filtering, for example the filtering operation in a coded loop.

FIG. 2 shows a process of a video coder. In FIG. 2, the $k^{th}$ CU (marked as $S_k[x, y]$) is taken as an example for illustration, where k is a positive integer greater than or equal to 1 and less than or equal to the number of CUs in the inputted current image, $S_k[x, y]$ represents a pixel point having coordinates [x, y] in the $k^{th}$ CU, x represents the horizontal coordinate of the pixel point, and y represents the vertical coordinate of the pixel point. The $S_k[x, y]$ is subjected to one of the operations such as motion compensation and intra (picture) prediction to obtain a predicted signal $\widehat{S_k}[x, y]$, the $\widehat{S_k}[x, y]$ is subtracted from the $S_k[x, y]$ to obtain a residual signal $U_k[x, y]$, and the residual signal $U_k[x, y]$ is transformed and quantized. There are two different destinations for quantized outputted data: first, the quantized output data is sent to an entropy coder for entropy coding, and the code stream after coding is outputted to a buffer for saving and waiting to be sent out; and secondly, the quantized outputted data is inversely quantized and inversely transformed to obtain a signal $U'_k[x, y]$. The signal $U'_k[x, y]$ and $\widehat{S_k}[x, y]$ are added to obtain a new predicted signal $S^*_k[x, y]$, and the $S^*_k[x, y]$ is sent to the buffer of the current image for saving. The $S^*_k[x, y]$ is subjected to intra-frame image prediction to obtain $f(S^*_k[x, y])$, the $S^*_k[x, y]$ is subjected to loop filtering to obtain $S'_k[x, y]$, and the $S'_k[x, y]$ is sent to a decoded image buffer for saving to generate reconstructed videos. The $S'_k[x, y]$ is subjected to motion compensated prediction to obtain $S'_r[x+m_x, y+m_y]$. The $S'_r[x+m_x, y+m_x]$ represents a reference block, and $m_x$ and $m_y$ respectively represent a horizontal component and a vertical component of a motion vector.

Based on the multimedia data being coded, the coded data flow may be encapsulated and transmitted to a user. The video file encapsulation refers to storing the coded and compressed video and audio in a format in a file according to an encapsulation format (or a container, or a file container). Encapsulation formats may include an audio video interleaved (AVI) format and an international standard organization (ISO) based media file format (ISOBMFF), where the ISOBMFF is an encapsulation standard for media files. ISOBMFF files include the moving picture experts group 4 (MP4) file.

The encapsulated file will be transmitted to a decoding device (for example a user terminal) through a video. After inverse operations such as de-encapsulation and decoding, the final video content can be presented in the decoding device. The encapsulated file can be transmitted to the decoding device through a transport protocol. For example, the transport protocol may be dynamic adaptive streaming over HTTP (DASH), which is an adaptive bit rate streaming technology. By using DASH for transmission, high-quality streaming media can be transmitted over the Internet through traditional HTTP network servers. In DASH, the media presentation description (MPD) in DASH is used to describe media segment information. Moreover, in DASH, one media component or a combination of a plurality of media components, such as a video file with a resolution, may be regarded as a representation, a plurality of representations included may be regarded as an adaptation set, and one DASH may include one or a plurality of adaptation sets.

The file de-encapsulation process of the decoding device is inverse to the foregoing file encapsulation process. The decoding device can de-encapsulate the encapsulated file according to the file format requirements during encapsulation to obtain audio code streams and video code streams. The decoding process of the decoding device is also inverse to the coding process. The decoding device can decode audio code streams to restore the audio content. According to the foregoing coding process, it can be seen that at the decoding side, for each CU, based on a decoder obtaining the compressed code stream, entropy decoding is performed first to obtain various mode information and quantized transform coefficients. Each coefficient is inversely quantized and inversely transformed to obtain the residual signal. On the other hand, according to the known coding mode information, a predicted signal corresponding to the CU can be obtained, and based on the two being added, a reconstructed signal can be obtained. Finally, the reconstruction value of the image is decoded, and a loop filtering operation may be performed to generate a final output signal.

It can be seen that the reconstructed image may be filtered in both the coding side and decoding side mentioned above. At present, the accuracy of the filtering mode of the image is relatively low, resulting in a poor filtering effect of the image. Based on this, in some embodiments, by introducing the associated image block and multi-dimension information such as the target coding and decoding information, a richer amount of information is provided for the filtering process of the target image block. Furthermore, the target coding and decoding information is configured for reflecting the degree of influence of the first associated image block on the target image block. The use of the target coding and decoding information utilize the quality of the associated image block to filter a reconstructed image block, and may differentially use the associated image block in the filtering process of the target image block, to increase the filtering accuracy of the target image block and improve the filtering quality of the target image block, thus increasing the filtering accuracy of images, improving the filtering effect of images, and further improving the coding quality of multimedia data.

Figure 4:
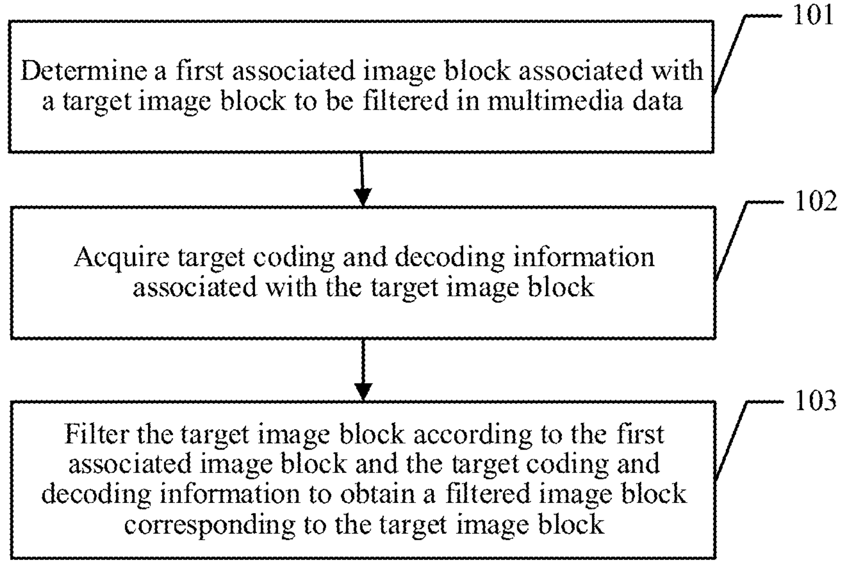
FIG. 4 is a schematic flowchart of a multimedia data processing method according to some embodiments.

Further, referring to FIG. 4, FIG. 4 is a schematic flowchart of a multimedia data processing method provided in some embodiments. The method may be executed by a computer device. The computer device may refer to a coding device or a decoding device. As shown in FIG. 4, the method may at least include 101 to 103:

101: Determine a first associated image block associated with a target image block to be filtered in multimedia data.

102: Acquire target coding and decoding information associated with the target image block.

In operation 101 and operation 102, a computer device can determine a reconstructed and unfiltered image block in the multimedia data as the target image block to be filtered, or determine a reconstructed image block that is preliminarily filtered in the multimedia data as the target image block to be filtered. The preliminary filtering here may refer to a traditional filtering mode. Further, the first associated image block associated with the target image block can be acquired, and the target coding and decoding information of the first associated image block associated with the target image block can be acquired. The target coding and decoding information includes the coding and decoding information corresponding to the first associated image block. The target coding and decoding information may also include the coding and decoding information corresponding to the target image block. The first associated image block belongs to an associated image having a coding reference relationship with the target image block, for example, the first associated image block belongs to a reference image having a coding reference relationship with the target image block.

The multimedia data includes multiple frames of images, the multiple frames of images may be referred to as a sequence of the multimedia data, one frame of image includes one or a plurality of slices, and one slice includes one or a plurality of image blocks. Based on one frame of image including one slice and one slice includes one image block, the image block refers to an image corresponding to the image block. According to coding modes of slices, the slices of images are partitioned into full intraframe coding slices and non-full intraframe coding slices. The full intraframe coding slice means that the coding mode of all image blocks in the slice is an intraframe coding (for example intra (picture) prediction) mode. The non-full intraframe coding slice means that the coding mode of image blocks in the slice may be an interframe coding (for example inter (picture) prediction) mode. Based on all slices in an image belonging to full intraframe coding slices, the image may also be referred to as an I-frame, for example a key frame. Based on slices in an image belonging to non-full intraframe coding slices, the image may be a B-frame or a P-frame. An uncoded image block in the image may be referred to as an original image block, a coded original image block in the image may be referred to as a coded image block (or a predicted image block), a reconstructed coded image block in the image may be referred to as a reconstructed image block, an unfiltered reconstructed image block or a preliminarily filtered reconstructed image block in the image may be referred to as a target image block to be filtered, and a target image block filtered by this solution in the image may be referred to as a filtered image block.

In multimedia data coding technologies, a temporal layering technology is also involved. This technology can partition different image frames into different temporal layers according to the dependency relationship during coding. By using the temporal layering technology to partition the temporal layers of images in multimedia data, image frames partitioned into low layers may not refer to higher-layer image frames during coding. The temporal layer of an image can be configured to reflect a coding order of the image, for example, the lower the temporal layer of the image, the higher the coding order; and the higher the temporal layer of the image, the lower the coding order. The temporal layer of an image can also be configured to reflect an image distance between the image and a reference image thereof, for example, the higher the temporal layer of the image, the closer the image distance between the image and the reference image thereof; and the lower the temporal layer of the image, the farther the image distance between the image and the reference image thereof. The temporal layers of image blocks located in the same image are the same. The temporal layer of an image block refers to a temporal layer of an image to which the image block belongs.

Figure 5:
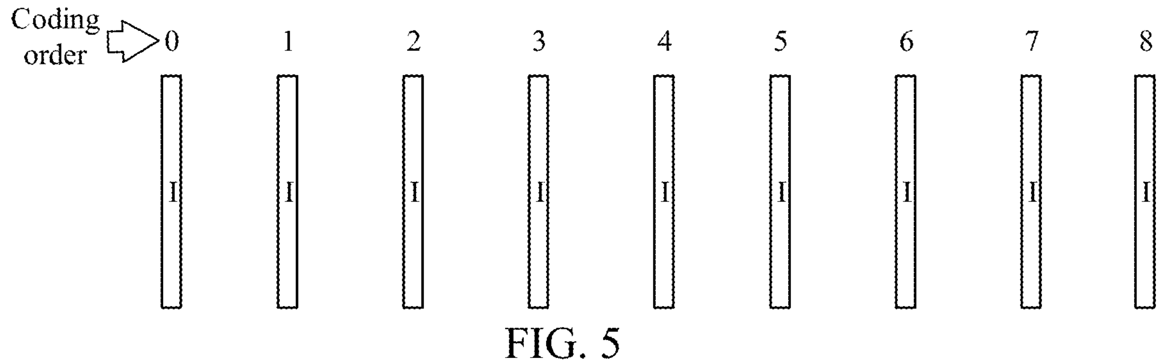
FIG. 5 is a schematic diagram reflecting a coding reference relationship between image frames according to some embodiments.

The target image block and the first associated image block may belong to the same image in multimedia data or belong to different images in multimedia data. For example, if the image to which the target data block belongs is an I-frame which refers to a key frame, an image frame in this medium type only allows the use of an intraframe coding mode and does not depend on other image frames for coding, for example, the coding mode of the target image block is the intraframe coding mode, and thus, the target image block can be used as the first associated image block. As shown in FIG. 5, the multimedia data includes 9 frames of images, the coding mode of the 9 frames of images is the intraframe coding mode, the coding process of the image block in each frame of image depends on the image block in each image, the number above each frame of image is configured to represent the coding order of each frame of image, the frames of images do not have a coding reference relationship, and the temporal layer Id of each frame of image is 0.

Figure 6:
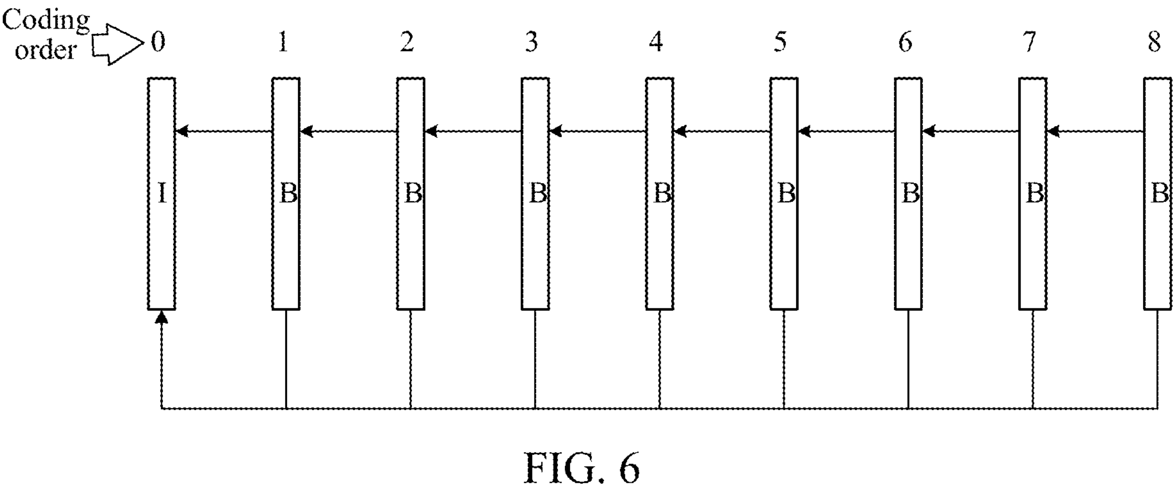
FIG. 6 is a schematic diagram reflecting a coding reference relationship between image frames according to some embodiments.

For another example, if the image to which the target data block belongs is a B-frame or a P-frame, which can also be referred to as an inter-coded frame, this image frame allows the use of an interframe coding mode and an intraframe coding mode, at this time, the coding mode of the target image block is a non-intraframe coding mode, and thus, the first associated image block belongs to an associated image having a coding reference relationship with the target image block. As shown in FIG. 6, the multimedia data includes 9 frames of images, where the medium type of 8 frames of images is a B-frame, the medium type of 1 frame of image is an I-frame, the number above each frame of image is configured to represent the coding order of each frame of image, and the arrow between the frames of images is configured to reflect the coding reference relationship between the frames of images. As shown in FIG. 6, the temporal layer Id of each frame of image is 0, the medium type of an image with the first coding order is an I-frame, and the medium type of an image with a coding order after the first coding order is a B-frame. The coding process of each B-frame refers to the first I-frame and the corresponding adjacent image frame (for example the image frame with a coding order before the coding order of the B-frame), for example, if the target image block belongs to the B-frame in FIG. 6, the first associated image block belongs to an adjacent image of the image to which the first I-frame or the target image block belongs. If the target image block belongs to an image with the third coding order, two first associated image blocks associated with the target image block are provided, such as a first associated image block 1 and a first associated image block 2, where the first associated image block 1 belongs to the first I-frame, and the first associated image block 2 belongs to an image with the second coding order.

Figure 7:
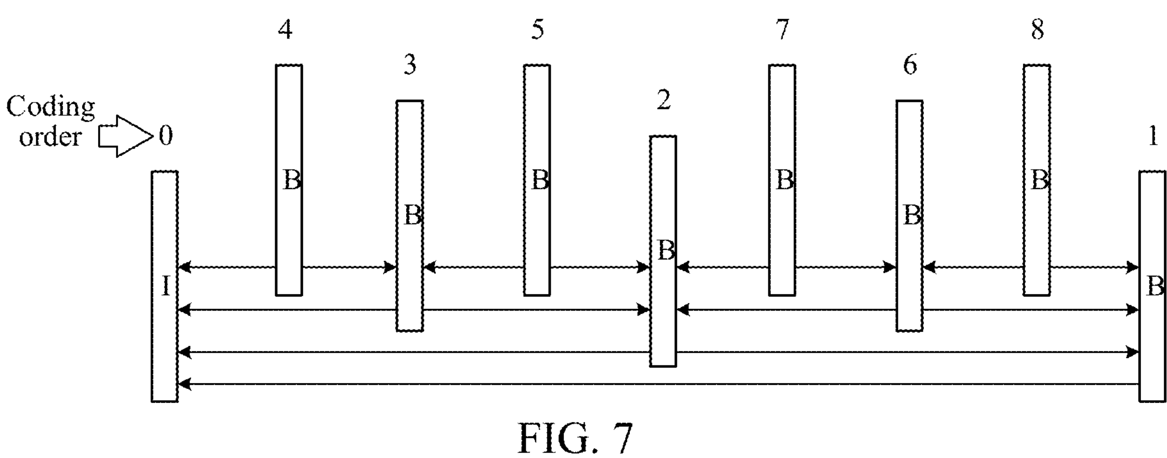
FIG. 7 is a schematic diagram reflecting a coding reference relationship between image frames according to some embodiments.

For another example, as shown in FIG. 7, the multimedia data includes 9 frames of images, where the medium type of 8 frames of images is a B-frame, the medium type of 1 frame of image is an I-frame, the number above each frame of image is configured to represent the coding order of each frame of image, and the arrow between the frames of images is configured to reflect the coding reference relationship between the frames of images. As shown in FIG. 7, the medium type of an image with the first coding order is an I-frame, and the medium type of an image with a coding order after the first coding order is a B-frame. The temporal layer of an image with the first coding order and the temporal layer of an image with the second coding order are both 0, represented as Layer0. The temporal layer of an image with the third coding order is 1, represented as Layer1. The temporal layer of an image with the fourth coding order and the temporal layer of an image with the seventh coding order are both 2, represented as Layer2. The temporal layer of an image with the fifth coding order, the temporal layer of an image with the sixth coding order, the temporal layer of an image with the eighth coding order, and the temporal layer of an image with the ninth coding order are all 3, represented as Layer3. The coding process of an image at a low temporal layer does not depend on an image at a high temporal layer, and the coding process of an image at a high temporal layer can depend on an image at a low temporal layer.

The low and high temporal layers mentioned in some embodiments are a relative concept. For four temporal layers Layer0 to Layer3 determined in FIG. 7, in terms of the temporal layer Layer0, the Layer1 to the Layer3 are all high temporal layers; and in terms of the temporal layer Layer1, the temporal layer Layer3 is a high temporal layer relative to the Layer1, and the temporal layer Layer0 is a low temporal layer relative to the Layer1. In FIG. 7, if the target image block belongs to the image with the first coding order, the associated image block associated with the target image block also belongs to the image with the first coding order. If the target image block belongs to an image with the coding order after the first coding order (for example the image with the first coding order), the image to which the associated image block associated with the target image block belongs is different from the image to which the target image block belongs. If the target image block belongs to an image with the last coding order, the associated image block associated with the target image belongs to the image with the first coding order.

The target coding and decoding information is configured for reflecting the degree of influence of the first associated image block on the target image block. If the target coding and decoding information reflects a higher degree of influence of the first associated image block on the target image block, it indicates that the coding process of the target image block refers to more amount of information of the first associated image block. Therefore, the filtering process of the target image block can refer to more amount of information of the first associated image block. If the target coding and decoding information reflects a lower degree of influence of the first associated image block on the target image block, it indicates that the coding process of the target image block refers to less amount of information of the first associated image block. Therefore, the filtering process of the target image block can refer to less amount of information of the first associated image block. Differential use of the associated image block may be achieved through the target decoding information to increase the filtering accuracy of the target image block.

The target coding and decoding information includes the coding and decoding information corresponding to the first associated image block, or the target coding and decoding information includes the coding and decoding information corresponding to the first associated image block and the coding and decoding information corresponding to the target image block. The coding and decoding information corresponding to the target image block includes at least one of a sequence level quantization parameter, a slice level quantization parameter, a slice level coding type, a block coding type, filtering intensity image block information of the target image block, predicted image block information corresponding to the target image block, and partitioned image block information of the target image block. The predicted image block information corresponding to the target image block here includes all or part of the information of the predicted image block corresponding to the target image block. For example, the predicted image block information corresponding to the target image block includes at least one of the chrominance component information and brightness component information of the predicted image block corresponding to the target image block. The predicted image block corresponding to the target image block is obtained by performing predictive coding of the original image block corresponding to the target image block. The filtering intensity image block information of the target image block refers to at least one of the chrominance component information and brightness component information of the filtering intensity image block information corresponding to the target image block. The partitioned image block information of the target image block includes all or part of the information of the image block in the image generated by block partition. For example, the partitioned image block information of the target image block includes at least one of the chrominance component information and brightness component information of the image block in the image generated by block partition. The filtering intensity image block here is an image block generated based on the filtering intensity discrimination result of a deblocking filter in a codec. The partitioned image block information is an image block generated based on the coding block partition result. Sequence: The sequence refers to a series of coding frames. Slice: In the coding process of multimedia data, an image is partitioned into a plurality of slices, similar to Tile. If the image is not partitioned, one frame can be considered as one slice.

The coding and decoding information corresponding to the target image block may affect the image quality of the target image block. Therefore, the coding and decoding information corresponding to the target image block is used as auxiliary information for filtering the target image block.

The coding and decoding information corresponding to the first associated image block includes at least one of an influence factor of the first associated image block on the target image block, a reference direction of the first associated image block relative to the target image block, partitioned image block information of the first associated image block, a quantization parameter corresponding to the first associated image block, reconstructed image block information corresponding to the first associated image block, filtering intensity image block information corresponding to the first associated image block, and predicted image block information corresponding to the first associated image block. The coding and decoding information of the first associated image block is configured for reflecting the degree of influence of the first associated image block on the target image block. For example, the influence factor is determined according to the image distance between the first associated image block and the target image block. The influence factor is configured to reflect the degree of influence of the first associated image block on the target image block, where the larger the influence factor, the higher the degree of influence of the first associated image block on the target image block; and the smaller the influence factor, the lower the degree of influence of the first associated image block on the target image block. The influence factor is determined according to the image distance between the first associated image block and the target image block. The influence factor and the image distance have a negative correlation relationship, where the farther the image distance between the first associated image block and the target image block, the smaller the influence factor of the first associated image block on the target image block; and the closer the image distance between the first associated image block and the target image block, the larger the influence factor of the first associated image block on the target image block.

For another example, the quantization parameter corresponding to the first associated image block is configured to reflect the degree of influence of the first associated image block on the target image block, where the larger the quantization parameter corresponding to the first associated image block, the less the amount of information of the first associated image block, and the lower the degree of influence of the first associated image block on the target image block; and the smaller the quantization parameter corresponding to the first associated image block, the more the amount of information of the first associated image block, and the higher the degree of influence of the first associated image block on the target image block. For another example, the image block information corresponding to the first associated image block is configured for reflecting the degree of influence of the first associated image block on the target image block, where the more the amount of information of the image block information corresponding to the first associated image block, the higher the degree of influence of the first associated image block on the target image block; and the less the amount of information of the image block information corresponding to the first associated image block, the lower the degree of influence of the first associated image block on the target image block. The image block information corresponding to the first associated image block includes at least one of the reconstructed image block information corresponding to the first associated image block, the partitioned image block information, the filtering intensity image block information, and the predicted image block information. The reference direction of the first associated image block relative to the target image block can be used as auxiliary information for filtering the target image block to provide more auxiliary information for the filtering process of the target image block, thereby improving the filtering effect. If the slice in which the target image block is located is a non-full intraframe coding slice, the computer device can determine the image distance between the first associated image block and the target image block according to a picture order count (POC) corresponding to the first associated image block and a POC corresponding to the target image block, where the POC is configured to reflect a display order of the image to which the image block belongs; and if the slice in which the target image block is located is a full intraframe coding slice, a preset distance value is determined as the image distance between the first associated image block and the target image block, where the preset distance value may be 0, 1025, or other values. Based on the slice in which the target image block is located being a full intraframe coding slice, the slice in which the target image block is located may be referred to as an I-slice. Based on the slice in which the target image block is located being a non-full intraframe coding slice, the slice in which the target image block is located may be referred to as a P-slice or a B-slice. The image distance between the target image block and the associated image block can be generated in the foregoing mode, the I-slice, the B-slice and the P-slice can share the foregoing image filtering processor based on a neural network for filtering, and there may be no need to respectively train an image filtering processor based on a neural network for the I-slice, the B-slice and the P-slice, so that resources can be saved, and the universality of the image filtering processor based on a neural network can be increased.

The POC corresponding to the target image block refers to a POC of the image frame to which the target image block belongs. The POC corresponding to the first associated image block refers to a POC of the image frame to which the first associated image block belongs. The computer device can determine the image distance between the first associated image block and the target image block according to a POC corresponding to the first associated image block and a POC corresponding to the target image block in the following four modes:

Mode 1: The computer device can compute a count difference between the POC corresponding to the first associated image block and the POC corresponding to the target image block, and determine an absolute value of the count difference as the image distance between the first associated image block and the target image block.

Mode 2: The computer device can acquire a count difference between the POC corresponding to the first associated image block and the POC corresponding to the target image block; and compute a count mapping value corresponding to an absolute value of the count difference, and determine the image distance between the first associated image block and the target image block according to the count mapping value. The count mapping here may be (N-image distance)/M, where M may be a non-zero number, and N may be any value. For example, N is 1025, and M is 1024.

Mode 3: The computer device can acquire a temporal layer of the target image block, and determine the image distance between the first associated image block and the target image block according to the temporal layer of the target image block. For example, the image distance between the first associated image block and the target image block and the temporal layer of the target image block have a negative correlation relationship, where the higher the temporal layer of the target image block, the closer the image distance between the first associated image block and the target image block; and on the contrary, the lower the temporal layer of the target image block, the farther the image distance between the first associated image block and the target image block. For example, a difference between N and the temporal layer of the target image block can be determined as the image distance between the first associated image block and the target image block. For example, N—the temporal layer of the target image block can be determined as the image distance between the first associated image block and the target image block.

Mode 4: The computer device can determine a layer mapping value corresponding to the temporal layer of the target image block, and determine the image distance between the first associated image block and the target image block according to the layer mapping value. For example, a ratio between the temporal layer of the target image block and a preset temporal layer value is determined as the layer mapping value corresponding to the temporal layer of the target image block. For example, the preset temporal layer value is K which is a non-zero number; or a difference between the preset temporal layer value and the temporal layer of the target image block is determined as the layer mapping value corresponding to the temporal layer of the target image block.

The image block information corresponding to the first associated image block includes at least one of first color component information, second color component information, and third color component information, where the first color component information is configured for reflecting the brightness of the image block, the second color component information and the third color component information are configured for reflecting the chrominance of the image block, and the image block information corresponding to the first associated image block includes any one of the reconstructed image block information, the partitioned image block information, the filtering intensity image block information, and the predicted image block information corresponding to the first associated image block.

If the slice in which the target image block is located is a non-full intraframe coding slice, the computer device can determine a reference direction of the first associated image block relative to the target image block according to the size relationship between a POC corresponding to the first associated image block and a POC corresponding to the target image block. If the slice in which the target image block is located is a full intraframe coding slice, a reference direction of the first associated image block relative to the target image block is indicated by using a preset direction value. That is to say, the reference direction of the first associated image block relative to the target image block is determined in the foregoing mode, the I-slice, the B-slice and the P-slice can share the foregoing image filtering processor based on a neural network for filtering, and there may be no need to respectively train an image filtering processor based on a neural network for the I-slice, the B-slice and the P-slice, so that resources can be saved, and the universality of the image filtering processor based on a neural network can be increased.

For example, if the slice in which the target image block is located is a non-full intraframe coding slice and the POC corresponding to the first associated image block is greater than the POC corresponding to the target image block, the reference direction of the first associated image block relative to the target image block is indicated by using a first direction value; and if the slice in which the target image block is located is a non-full intraframe coding slice and the POC corresponding to the first associated image block is less than the POC corresponding to the target image block, the reference direction of the first associated image block relative to the target image block is indicated by using a second direction value. For example, the first direction value may be a value greater than 0, the second direction value may be a value less than 0, and the first direction value is different from the second direction value. For example, the first direction value may be 1, and the second direction value may be 0. If the slice in which the target image block is located is a full intraframe coding slice, a reference direction of the first associated image block relative to the target image block is indicated by using a preset direction value, where the preset direction value may be 0, 1, 2, −1, or the like, the preset direction value may be the same as the first direction value or the second direction value, or the preset direction value may be different from both the first direction value and the second direction value.

The selection mode of first associated image blocks of the target image block may refer to selection of one or a plurality of image blocks as first associated image blocks in a specified reference direction. Based on the number of first associated image blocks being insufficient, available first associated image blocks are repeated for filling. There are three selection modes of first associated image blocks as follows: 1) one or two first associated image blocks are selected in a direction L0; 2) one or two first associated image blocks are selected in a direction L1; and 3) one or two first associated image blocks are selected in the direction L0, one or two first associated image blocks are selected in the direction L1, and the first associated image blocks include image blocks in the first reference frame in a reference frame list in the direction L0 and image blocks in the first reference frame in a reference frame list in the direction L1.

L0 may refer to a direction in which the POC of the image frame to which the first associated image block belongs is less than the POC of the image frame to which the target image block belongs, and L1 may refer to a direction in which the POC of the image frame to which the first associated image block belongs is greater than the POC of the image frame to which the target image block belongs. Or, both L0 and L1 refer to a direction in which the POC of the image frame to which the first associated image block belongs is less than the POC of the image frame to which the target image block belongs.

Figure 8A:
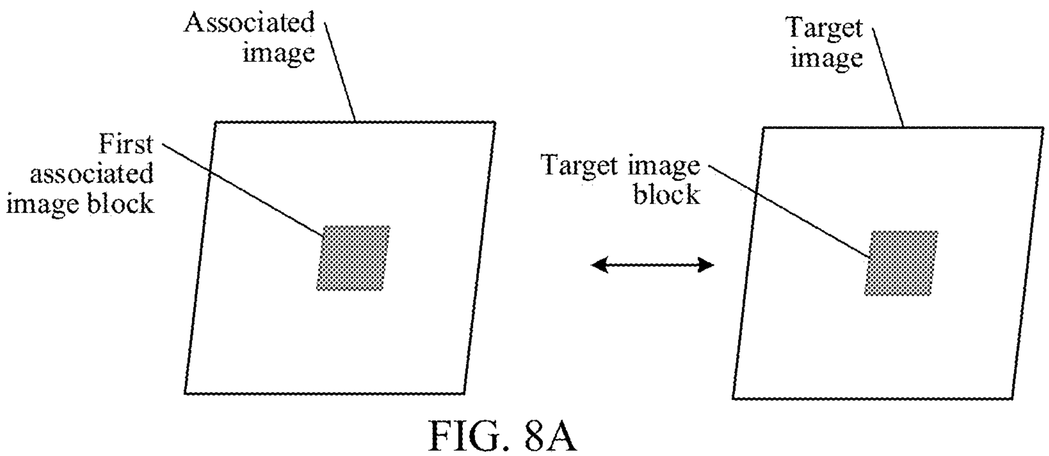
FIG. 8A is a schematic diagram of acquiring a first associated image block according to some embodiments.
Figure 8B:
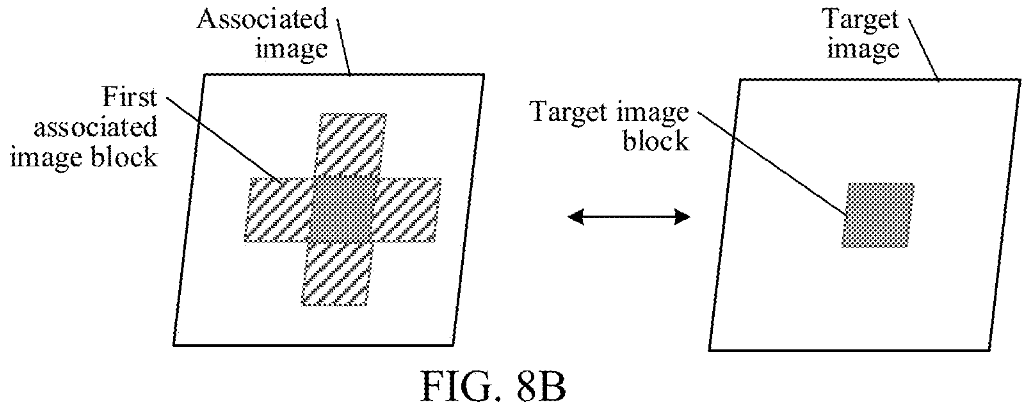
FIG. 8B is another schematic diagram of acquiring a first associated image block according to some embodiments.
Figure 8C:
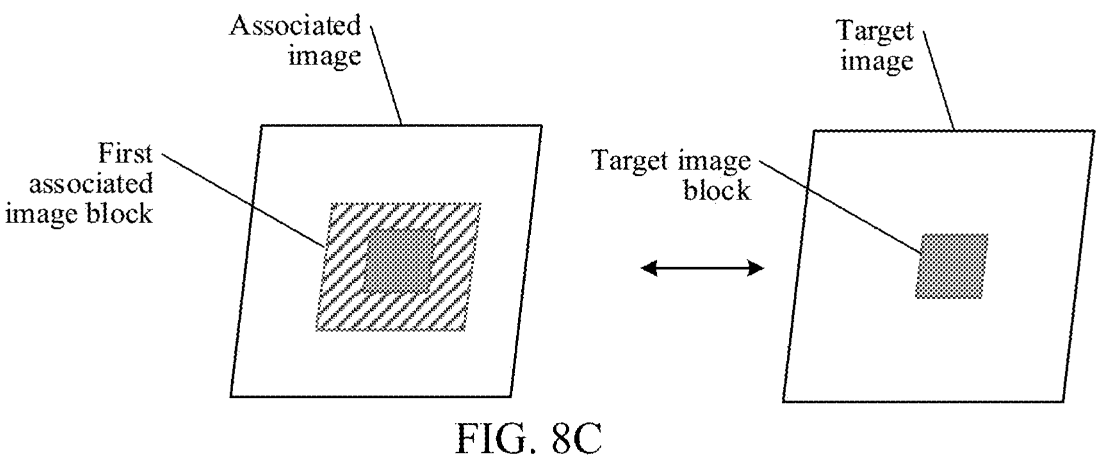
FIG. 8C is still another schematic diagram of acquiring a first associated image block according to some embodiments.

Based on the target image block and the first associated image block having the same spatial positional relationship, the size of the target image block is the same as the size of the first associated image block, or the size of the target image block is different from the size of the first associated image block. For example, the image to which the target image block belongs is a target image, and the image to which the first associated image block belongs is a reference image. Gray regions in target images in FIG. 8*a*, FIG. 8*b* and FIG. 8*c* are all target image blocks, and a gray region in a reference image in FIG. 8*a* is a first associated image block. Gray regions and diagonal filling regions in reference images in FIG. 8*b* and FIG. 8*c* are both first associated image blocks. In FIG. 8*a*, FIG. 8*b* and FIG. 8*c*, the target image block and the first associated image block have the same spatial positional relationship. The size of the target image block in FIG. 8*a* is the same as the size of the first associated image block, and the size of the target image block in FIG. 8*b* and FIG. 8*c* is less than the size of the first associated image block.

Based on the target image block and the first associated image block having different spatial positional relationships and the first associated image block being determined according to a motion vector of the target image block, the size of the target image block is the same as the size of the first associated image block, or the size of the target image block is different from the size of the first associated image block. The motion vector of the target image block is determined by a motion vector of each coding block in the target image block, such as an average motion vector.

Figure 9A:
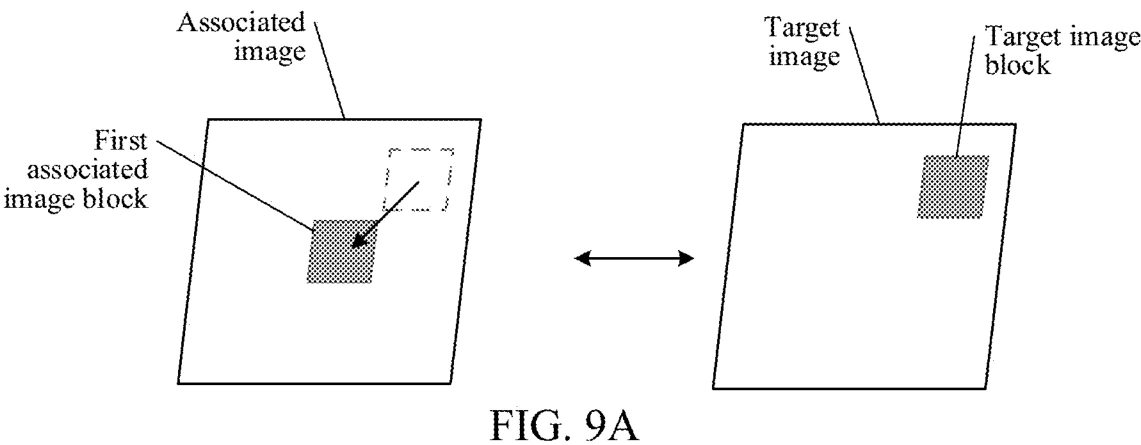
FIG. 9A is a further schematic diagram of acquiring a first associated image block according to some embodiments.
Figure 9B:
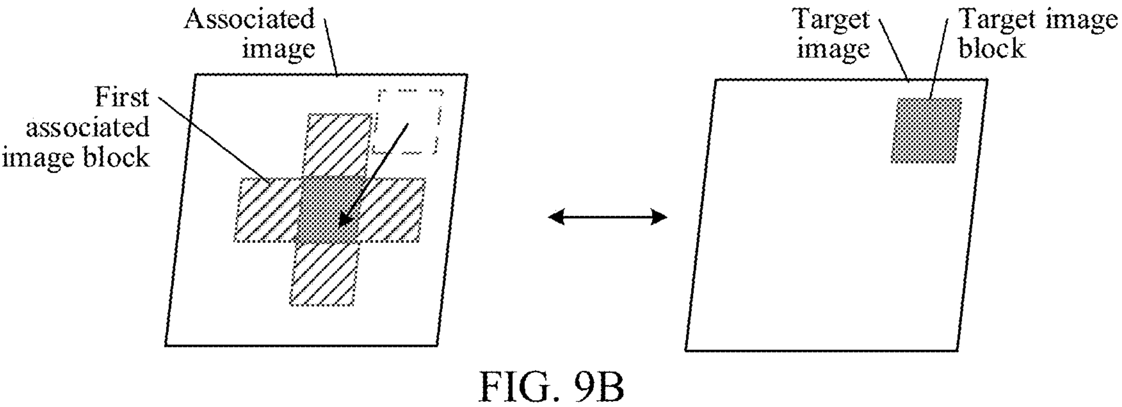
FIG. 9B is a still further schematic diagram of acquiring a first associated image block according to some embodiments.
Figure 9C:
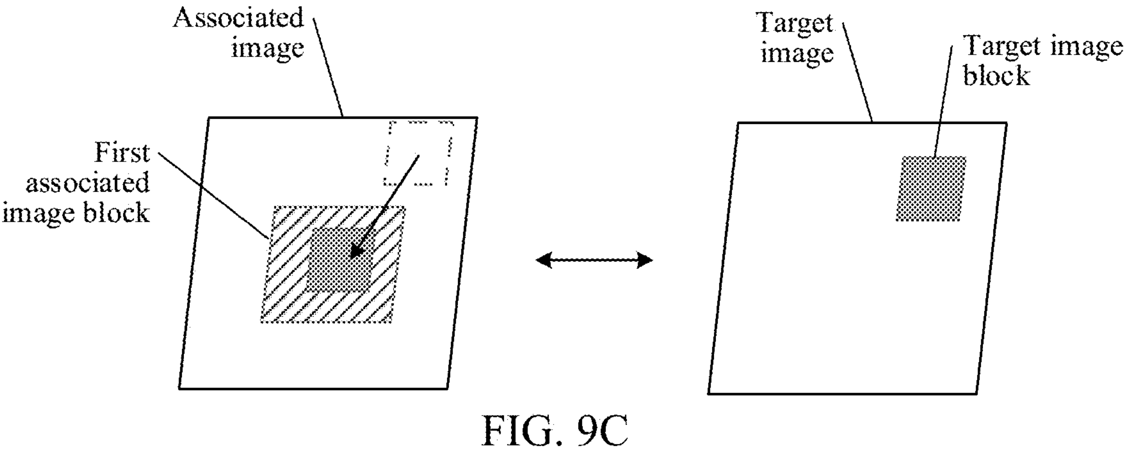
FIG. 9C is a yet further schematic diagram of acquiring a first associated image block according to some embodiments.

For example, the image to which the target image block belongs is a target image, and the image to which the first associated image block belongs is a reference image. The arrows in FIG. 9*a*, FIG. 9*b* and FIG. 9*c* indicate the direction of the motion vector of the target image block, and the first associated image block is selected from the reference image according to the position indicated by the motion vector of the target image block. Gray regions in target images in FIG. 9*a*, FIG. 9*b* and FIG. 9*c* are all target image blocks, and a gray region in a reference image in FIG. 9*a* is a first associated image block. Gray regions and diagonal filling regions in reference images in FIG. 9*b* and FIG. 9*c* are both first associated image blocks. In FIG. 9*a*, FIG. 9*b* and FIG. 9*c*, the target image block and the first associated image block have different spatial positional relationships, and the first associated image block is located at the position indicated by the motion vector of the target image block in the reference image. The size of the target image block in FIG. 9*a* is the same as the size of the first associated image block, and the size of the target image block in FIG. 9*b* and FIG. 9*c* is less than the size of the first associated image block.

103: Filter the target image block by an image filtering processor based on a neural network according to the first associated image block and the target coding and decoding information to obtain a filtered image block corresponding to the target image block.

In some embodiments, the computer device can filter the target image block by an image filtering processor based on a neural network according to the first associated image block and the target coding and decoding information to obtain a filtered image block corresponding to the target image block. For example, if the target coding and decoding information reflects a higher degree of influence of the first associated image block on the target image block, the computer device can set a larger influence factor (for example weight) for the first associated image block during the filtering process of the target image block, which may increase the impact of the first associated image block in the filtering process of the target image block. On the contrary, if the target coding and decoding information reflects a lower degree of influence of the first associated image block on the target image block, the computer device can set a smaller influence factor (for example weight) for the first associated image block during the filtering process of the target image block, which may decrease the impact of the first associated image block in the filtering process of the target image block. The use of the target coding and decoding information and the image filtering processor based on a neural network may utilize the quality of the associated image block to filter a reconstructed image block, and may differentially use the associated image block in the filtering process of the target image block, thereby increasing the filtering accuracy of the target image block.

Figure 10:
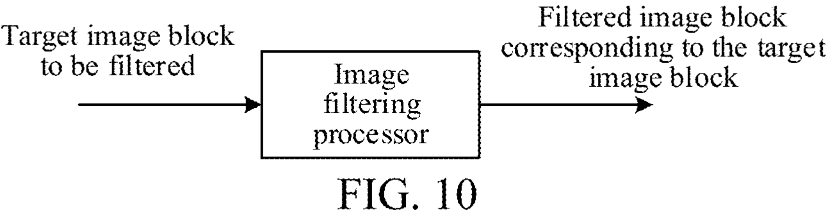
FIG. 10 is a schematic diagram of filtering a target image block by an image filtering processor based on a neural network according to some embodiments.

The computer device can filter the target image block by the image filtering processor based on a neural network according to the first associated image block and the target coding and decoding information to obtain a filtered image block corresponding to the target image block. The image filtering processor based on a neural network here may refer to an in-loop filter for filtering image blocks. For example, the image filtering processor based on a neural network may be a neural network in-loop filter (NNLF), or the like. As shown in FIG. 10, the computer device can input the target image block to be filtered, the first associated image block and the target coding and decoding information into the image filtering processor based on a neural network, filter the target image block by the image filtering processor based on a neural network according to the first associated image block and the target coding and decoding information, and output a filtered image block by the image filtering processor based on a neural network, where the filtered image block is the filtered image block corresponding to the target image block.

Figure 11:
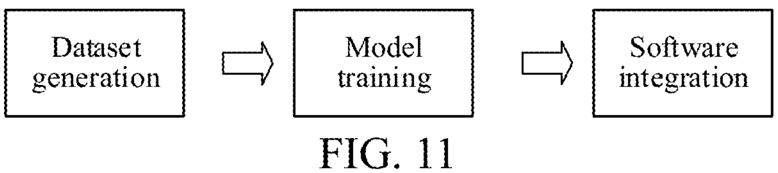
FIG. 11 is a schematic diagram of generating an image filtering processor based on a neural network according to some embodiments.

As shown in FIG. 11, a process for generating the image filtering processor based on a neural network includes the following three operations: 1) Use coding software to code training sequences to generate a training set. 2) Train an initial image filtering processor based on a neural network based on the training set to obtain an image filtering processor based on a neural network. 3) Integrate the image filtering processor based on a neural network into software, and filter the target image block by the software integrated with the image filtering processor based on a neural network. A loss function is used in the training process of the initial image filtering processor based on a neural network. The loss function is configured to measure the difference between a predicted value (a filtered image corresponding to a sample image block) and a true value (an original image block corresponding to the sample image block), where the larger the loss value "loss", the greater the difference. The purpose of training is to reduce the "loss". For coding tools based on deep learning, loss functions may include: an L1 norm loss function, an L2 norm loss function, and a smooth L1 loss function.

The image filtering processor based on a neural network may include a plurality of convolutional layers, a plurality of activation layers, a plurality of Resblock layers, and a shuffle layer, where the convolutional layer is configured to extract different features inputted, the activation layer is configured to perform non-linear mapping on an output result of the convolutional layer, the Resblock layer is a module of the image filtering processor based on a neural network, and the shuffle is configured to obtain data with the same information dimension as the original image block corresponding to the target image block by adjusting.

Figure 12A:
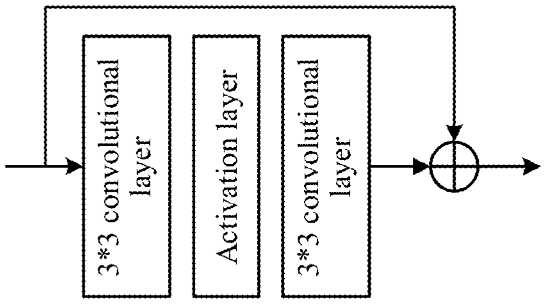
FIG. 12A is a schematic structural diagram of Resblock in an image filtering processor based on a neural network according to some embodiments.

The numbers of channels of the convolutional layers (convolutional modules) are exactly the same, for example, the numbers of input and output channels of all convolutional layers in the Resblock layer are equal. The Resblock layer in FIG. 12A includes two 3*3 convolutional layers, and the numbers of input and output channels of the two 3*3 convolutional layers are both equal. For example, the numbers of input and output channels are respectively 64 and 64.

Figure 12B:
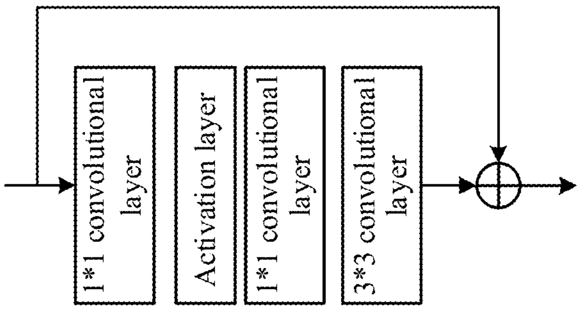
FIG. 12B is another schematic structural diagram of Resblock in an image filtering processor based on a neural network according to some embodiments.

The numbers of channels of convolutional layers are different, for example, the numbers of input and output channels of all convolutional layers in the Resblock layer may be unequal. The Resblock layer in FIG. 12B includes two 1*1 convolutional layers and a 3*3 convolutional layer, and the numbers of input and output channels of the two 1*1 convolutional layers and the 3*3 convolutional layer are unequal. For example, the number of channels before the activation layer may be increased and the number of channels after the activation layer may be reduced: the numbers of input and output channels of the first 1*1 convolutional layer are respectively 64 and 160, the numbers of input and output channels of the second 1*1 convolutional layer are respectively 160 and 64, and the numbers of input and output channels of the 3*3 convolutional layer are respectively 64 and 64.

The computer device can filter the target image block in any one of the following two modes:

Mode 1: The target coding and decoding information includes the coding and decoding information corresponding to the first associated image block, and the coding and decoding information corresponding to the first associated image block refers to parameters related to the coding and decoding processes of the first associated image block. The computer device can fuse the first associated image block with the coding and decoding information corresponding to the first associated image block by an information fusion layer of the image filtering processor based on a neural network to obtain target fusion data corresponding to the first associated image block. Further, the computer device can filter the target image block according to the target fusion data corresponding to the first associated image block by a filtering layer of the image filtering processor based on a neural network to obtain a filtered image block corresponding to the target image block. The use of the coding and decoding information corresponding to the first associated image block may utilize the quality of the first associated image block to improve the filtering accuracy and filtering quality of the target image block.

Mode 2: The target coding and decoding information includes the coding and decoding information corresponding to the first associated image block, and the coding and decoding information corresponding to the target image block. The computer device can fuse the first associated image block with the coding and decoding information corresponding to the first associated image block by an information fusion layer of the image filtering processor based on a neural network to obtain target fusion data corresponding to the first associated image block. Further, the computer device can filter the target image block according to the target fusion data corresponding to the first associated image block and the coding and decoding information corresponding to the target image block by a filtering layer of the image filtering processor based on a neural network to obtain a filtered image block corresponding to the target image block. The use of the coding and decoding information corresponding to the first associated image block and the coding and decoding information corresponding to the target image block may utilize the quality of the first associated image block to provide more information for the filtering process of the target image block, thereby improving the filtering accuracy and filtering quality of the target image block.

The information fusion layer of the image filtering processor based on a neural network may refer to a convolutional layer of the image filtering processor based on a neural network, or the information fusion layer of the image filtering processor based on a neural network refers to a combination of a point multiplication module and a convolutional layer of the image filtering processor based on a neural network.

The number of the first associated image block is M, and M is an integer greater than or equal to 1. The computer device can fuse the first associated image block with the coding and decoding information corresponding to the first associated image block in any one of the following three fusion modes to obtain target fusion data corresponding to the first associated image block:

Fusion mode 1: The image filtering processor based on a neural network includes M information fusion layers, and one information fusion layer corresponds to one associated image block. Based on one first associated image block being provided, the image filtering processor based on a neural network includes one information fusion layer, and the computer device can perform a convolution operation on the first associated image block and the coding and decoding information corresponding to the first associated image block by the information fusion layer of the image filtering processor based on a neural network to obtain target fusion data corresponding to the first associated image block. Based on at least two first associated image blocks being provided, the computer device can perform a convolution operation on a first associated image block 1 and the coding and decoding information corresponding to the first associated image block 1 by an information fusion layer 1 of the image filtering processor based on a neural network to obtain fusion data corresponding to the first associated image block 1, where the information fusion layer 1 of the image filtering processor based on a neural network is an information fusion layer corresponding to the first associated image block 1 in the M information fusion layers; and the computer device can perform a convolution operation on a first associated image block 2 and the coding and decoding information corresponding to the first associated image block 2 by an information fusion layer 2 of the image filtering processor based on a neural network to obtain fusion data corresponding to the first associated image block 2, where the information fusion layer 2 of the image filtering processor based on a neural network is an information fusion layer corresponding to the first associated image block 2 in the M information fusion layers. The foregoing operations are repeated until the fusion data corresponding to the M first associated image blocks respectively is acquired. If the fusion data corresponding to the M first associated image blocks respectively is acquired, the fusion data corresponding to the M first associated image blocks respectively is determined as target fusion data corresponding to the first associated image block. The coding and decoding information of each first associated image block is fused with the first associated image block in a convolution operation mode, which may improve the filtering accuracy and filtering quality of the target image block.

Figure 13A:
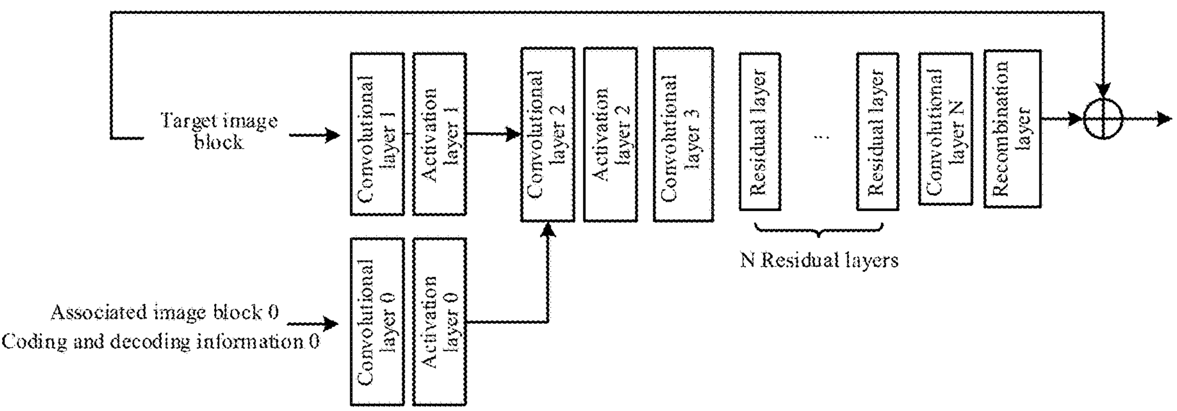
FIG. 13A is a schematic diagram of filtering a target image block by an image filtering processor based on a neural network according to some embodiments.

For example, as shown in FIG. 13A, the image filtering processor based on a neural network includes at least two convolutional layers, N Resblock layers, a plurality of activation layers, and a shuffle layer, where the at least two convolutional layers are respectively marked as a convolutional layer 0, a convolutional layer 1, a convolutional layer 2, a convolutional layer 3, . . . , and a convolutional layer N; and the activation layers include an activation layer 0, an activation layer 1, an activation layer 2, . . . . Based on the target coding and decoding information including the coding and decoding information corresponding to the first associated image block, the first associated image block includes an associated image block 0, and the coding and decoding information corresponding to the associated image block 0 is coding and decoding information 0. The computer device can input the associated image block 0 and the coding and decoding information 0 into the convolutional layer 0, a convolution operation is performed on the associated image block 0 and the coding and decoding information 0 by the convolutional layer 0 to obtain fusion data corresponding to the associated image block 0, and the fusion data corresponding to the associated image block 0 is determined as target fusion data corresponding to the first associated image block. A convolution operation is performed on the target image block by the convolutional layer 1, and a convolution operation is performed on the processing result on the target image block outputted by the activation layer 1 and the processing result on the target fusion data outputted by the activation layer 0 by the convolutional layer 2.

Figure 13B:
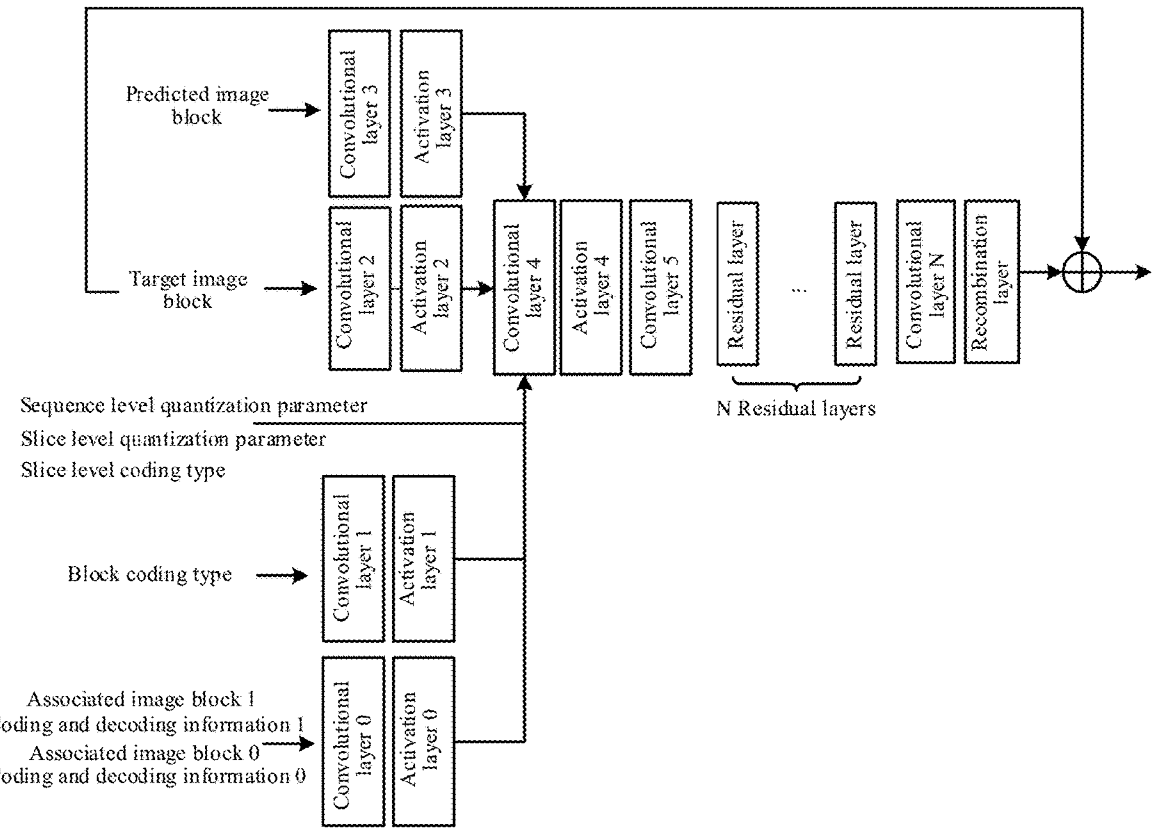
FIG. 13B is another schematic diagram of filtering a target image block by an image filtering processor based on a neural network according to some embodiments.

For example, as shown in FIG. 13B, the image filtering processor based on a neural network includes at least two convolutional layers, N Resblock layers, a plurality of activation layers, and a shuffle layer, where the at least two convolutional layers are respectively marked as a convolutional layer 0, a convolutional layer 1, a convolutional layer 2, a convolutional layer 3, . . . , and a convolutional layer N; and the activation layers include an activation layer 0, an activation layer 1, an activation layer 2, . . . . Based on the target coding and decoding information including the coding and decoding information corresponding to the first associated image block and the coding and decoding information corresponding to the target image block, the first associated image blocks include an associated image block 0 and an associated image block 1, the coding and decoding information corresponding to the associated image block 0 is coding and decoding information 0, and the coding and decoding information corresponding to the associated image block 1 is coding and decoding information 1. The convolutional layer 0 corresponds to the associated image block 0, and the convolutional layer 1 corresponds to the associated image block 1. The computer device can input the associated image block 0 and the coding and decoding information 0 into the convolutional layer 0, and a convolution operation is performed on the associated image block 0 and the coding and decoding information 0 by the convolutional layer 0 to obtain fusion data corresponding to the associated image block 0; and the computer device can input the associated image block 1 and the coding and decoding information 1 into the convolutional layer 1, and a convolution operation is performed on the associated image block 1 and the coding and decoding information 1 by the convolutional layer 1 to obtain fusion data corresponding to the associated image block 1. The fusion data corresponding to the associated image block 0 and the fusion data corresponding to the associated image block 1 are determined as target fusion data corresponding to the first associated image block. As shown in FIG. 13B, the coding and decoding information corresponding to the target image block includes a sequence level quantization parameter, a slice level quantization parameter, a slice level coding type, a block coding type, and a predicted image block corresponding to the target image block.

Fusion mode 2: The image filtering processor based on a neural network includes one information fusion layer, and the computer device can perform a convolution operation on M first associated image blocks and coding and decoding information by the information fusion layer of the image filtering processor based on a neural network to obtain target fusion data corresponding to the first associated image block. For example, M first associated image blocks and coding and decoding information are inputted into an information fusion layer of the image filtering processor based on a neural network, and a convolution operation is performed on the M first associated image blocks and the coding and decoding information by the information fusion layer of the image filtering processor based on a neural network to obtain target fusion data corresponding to the first associated image block. The coding and decoding information of each first associated image block is fused with the first associated image block in a convolution operation mode, which may improve the filtering accuracy and filtering quality of the target image block.

Figure 13C:
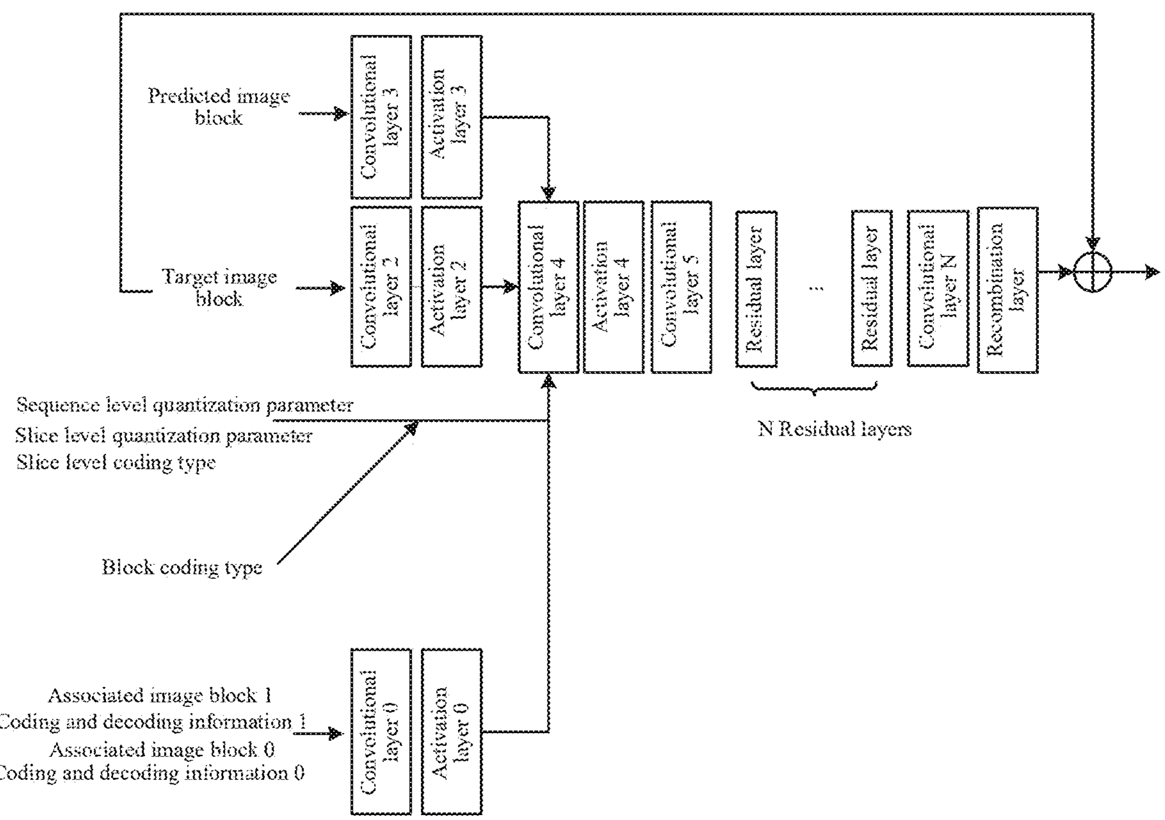
FIG. 13C is still another schematic diagram of filtering a target image block by an image filtering processor based on a neural network according to some embodiments.

For example, as shown in FIG. 13C, the image filtering processor based on a neural network includes at least two convolutional layers, N Resblock layers, a plurality of activation layers, and a shuffle layer, where the at least two convolutional layers are respectively marked as a convolutional layer 0, a convolutional layer 1, a convolutional layer 2, a convolutional layer 3, . . . , and a convolutional layer N; and the activation layers include an activation layer 0, an activation layer 1, an activation layer 2, . . . . Based on the target coding and decoding information including the coding and decoding information corresponding to the first associated image block and the coding and decoding information corresponding to the target image block, the first associated image blocks include an associated image block 0 and an associated image block 1, the coding and decoding information corresponding to the associated image block 0 is coding and decoding information 0, and the coding and decoding information corresponding to the associated image block 1 is coding and decoding information 1. The computer device can input the associated image block 0, the associated image block 1, the coding and decoding information 0, and the coding and decoding information 1 into the convolutional layer 0, and a convolution operation is performed on the associated image block 0, the associated image block 1, the coding and decoding information 0, and the coding and decoding information 1 by the convolutional layer 0 to obtain target fusion data corresponding to the first associated image block. As shown in FIG. 13C, the coding and decoding information corresponding to the target image block includes a sequence level quantization parameter, a slice level quantization parameter, a slice level coding type, a block coding type, and a predicted image block corresponding to the target image block.

Fusion mode 3: The image filtering processor based on a neural network includes M information fusion layers, and one information fusion layer corresponds to one associated image block. Based on one first associated image block being provided, the image filtering processor based on a neural network includes one information fusion layer. The computer device can perform a point multiplication operation on the first associated image block and the coding and decoding information corresponding to the first associated image block by the information fusion layer of the image filtering processor based on a neural network to obtain target fusion data corresponding to the first associated image block. Based on at least two first associated image blocks being provided, the computer device can perform a point multiplication operation on a first associated image block 1 and the coding and decoding information corresponding to the first associated image block 1 by an information fusion layer 1 of the image filtering processor based on a neural network to obtain fusion data corresponding to the first associated image block 1, where the information fusion layer 1 of the image filtering processor based on a neural network is an information fusion layer corresponding to the first associated image block 1 in the M information fusion layers; and the computer device can perform a point multiplication operation on a first associated image block 2 and the coding and decoding information corresponding to the first associated image block 2 by an information fusion layer 2 of the image filtering processor based on a neural network to obtain fusion data corresponding to the first associated image block 2, where the information fusion layer 2 of the image filtering processor based on a neural network is an information fusion layer corresponding to the first associated image block 2 in the M information fusion layers. The foregoing operations are repeated until the fusion data corresponding to the M first associated image blocks respectively is acquired. If the fusion data corresponding to the M first associated image blocks respectively is acquired, a convolution operation is performed on the fusion data corresponding to the M first associated image blocks respectively to obtain target fusion data corresponding to the first associated image block. The coding and decoding information of each first associated image block is fused with the first associated image block in a point multiplication operation mode, which may improve the filtering accuracy and filtering quality of the target image block.

Figure 13D:
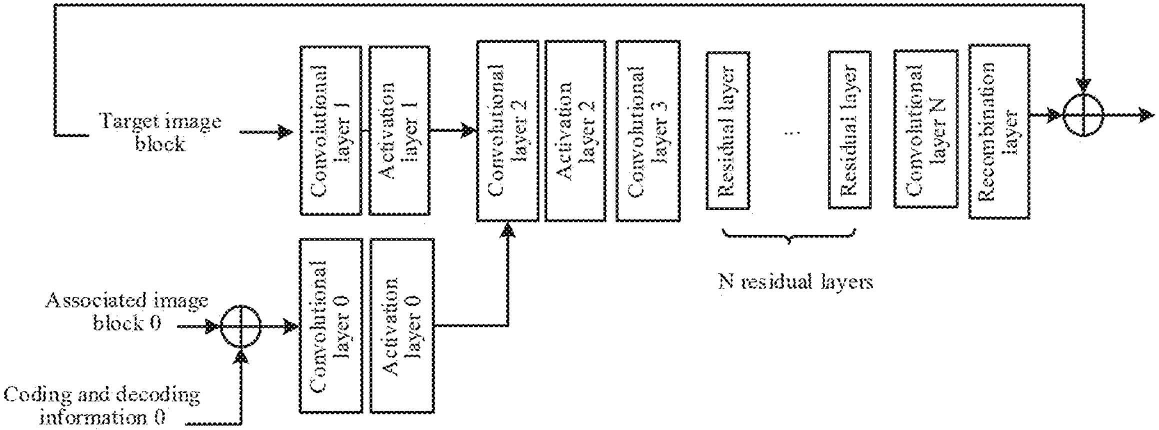
FIG. 13D is yet another schematic diagram of filtering a target image block by an image filtering processor based on a neural network according to some embodiments.

For example, as shown in FIG. 13D, the image filtering processor based on a neural network includes at least two convolutional layers, N Resblock layers, a plurality of activation layers, and a shuffle layer, where the at least two convolutional layers are respectively marked as a convolutional layer 0, a convolutional layer 1, a convolutional layer 2, a convolutional layer 3, . . . , and a convolutional layer N; and the activation layers include an activation layer 0, an activation layer 1, an activation layer 2, . . . . Based on the target coding and decoding information including the coding and decoding information corresponding to the first associated image block, the first associated image block includes an associated image block 0, and the coding and decoding information corresponding to the associated image block 0 is coding and decoding information 0. The computer device can input the associated image block 0 and the coding and decoding information 0 into a point multiplication module, a point multiplication operation is performed on the associated image block 0 and the coding and decoding information 0 by the point multiplication module to obtain fusion data corresponding to the associated image block 0, the fusion data corresponding to the associated image block 0 is inputted into the convolutional layer 0, and a convolution operation is performed on the fusion data corresponding to the associated image block 0 in the convolutional layer 0 to obtain target fusion data corresponding to the first associated image block.

In operation 102, the computer device can acquire the image distance between the target image block and the first associated image block from the target coding and decoding information. If the image distance is greater than a distance threshold, it indicates that the similarity between the target image block and the first associated image block is relatively low, for example, the reference significance of the first associated image block for the target image block is relatively low, thereby prohibiting filtering the target image block according to the first associated image block. If the image distance is less than or equal to the distance threshold, it indicates that the similarity between the target image block and the first associated image block is relatively high, for example, the reference significance of the first associated image block for the target image block is relatively high, therefore, the computer device can filter the target image block according to the first associated image block to obtain a filtered image block corresponding to the target image block. By filtering the target image block with the image distance less than or equal to the distance threshold, the targeted use of the first associated image block may be achieved, thereby further improving the filtering performance of the image block.

Based on the image distance between the first associated image block and the target image block being determined according to a POC of the first associated image block and a POC of the target image block, in a case that the distance threshold is 2, if an absolute value corresponding to the difference between the POC of the first associated image block and the POC of the target image block is less than or equal to 2, the target image block is filtered according to the first associated image block and the target coding and decoding information to obtain a filtered image block corresponding to the target image block; and if an absolute value corresponding to the difference between the POC of the first associated image block and the POC of the target image block is greater than 2, it is prohibited to filter the target image block according to the first associated image block to obtain a filtered image block corresponding to the target image block.

Based on the image distance between the first associated image block and the target image block being determined according to the temporal layer of the target image block, the image distance between the first associated image block and the target image block and the temporal layer of the target image block have a negative correlation relationship; in a case that the distance threshold is 4, if the temporal layer of the target image block is greater than or equal to 4, the target image block is filtered according to the first associated image block and the target coding and decoding information to obtain a filtered image block corresponding to the target image block; and if the temporal layer of the target image block is less than 4, it is prohibited to filter the target image block according to the first associated image block to obtain a filtered image block corresponding to the target image block.

Figure 13E:
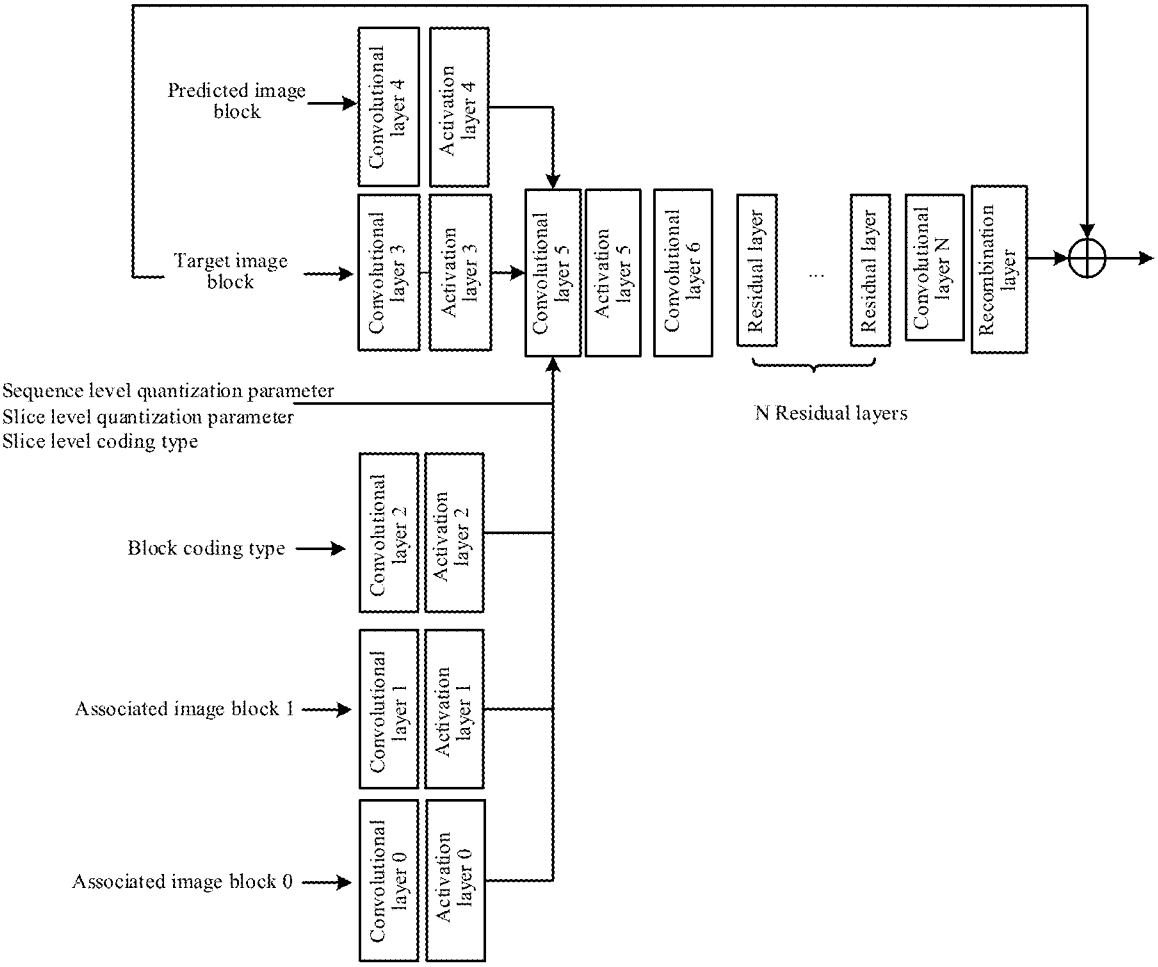
FIG. 13E is still yet another schematic diagram of filtering a target image block by an image filtering processor based on a neural network according to some embodiments.

For example, as shown in FIG. 13E, the image filtering processor based on a neural network includes at least two convolutional layers, N Resblock layers, a plurality of activation layers, and a shuffle layer, where the at least two convolutional layers are respectively marked as a convolutional layer 0, a convolutional layer 1, a convolutional layer 2, a convolutional layer 3, . . . , and a convolutional layer N; and the activation layers include an activation layer 0, an activation layer 1, an activation layer 2, . . . . If the image distance between the first associated image block and the target image block is greater than the distance threshold, the computer device can prohibit filtering the target image block according to the first associated image block. If the image distance between the first associated image block and the target image block is less than or equal to the distance threshold, the computer device can input the target coding and decoding information and the first associated image block into the image filtering processor based on a neural network, where the target coding and decoding information includes the coding and decoding information corresponding to the target image block, and the first associated image blocks include an associated image block 0 and an associated image block 1. For example, a convolution operation is performed on the associated image block 0 by the convolutional layer 0 of the image filtering processor based on a neural network to obtain fusion data corresponding to the associated image block 0; a convolution operation is performed on the associated image block 1 by the convolutional layer 1 of the image filtering processor based on a neural network to obtain fusion data corresponding to the associated image block 1; and the fusion data corresponding to the associated image block 0 and the fusion data corresponding to the associated image block 1 are determined as target fusion data corresponding to the associated image block. As shown in FIG. 13E, the coding and decoding information corresponding to the target image block includes a sequence level quantization parameter, a slice level quantization parameter, a slice level coding type, a block coding type, and a predicted image block corresponding to the target image block.

Figure 13F:
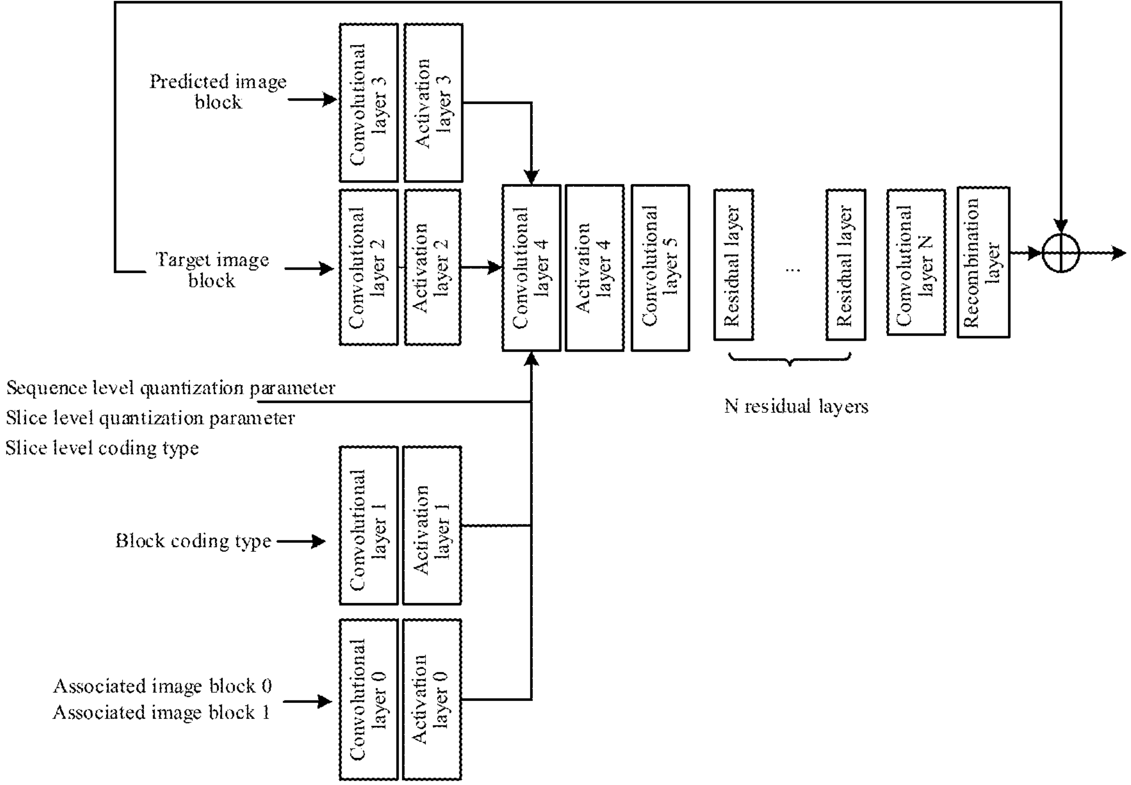
FIG. 13F is a further schematic diagram of filtering a target image block by an image filtering processor based on a neural network according to some embodiments.

For another example, as shown in FIG. 13F, the image filtering processor based on a neural network includes at least two convolutional layers, N Resblock layers, a plurality of activation layers, and a shuffle layer, where the at least two convolutional layers are respectively marked as a convolutional layer 0, a convolutional layer 1, a convolutional layer 2, a convolutional layer 3, . . . , and a convolutional layer N; and the activation layers include an activation layer 0, an activation layer 1, an activation layer 2, . . . . If the image distance between the first associated image block and the target image block is greater than the distance threshold, the computer device can prohibit filtering the target image block according to the first associated image block. If the image distance between the first associated image block and the target image block is less than or equal to the distance threshold, the computer device can input the target coding and decoding information and the first associated image block into the image filtering processor based on a neural network, where the target coding and decoding information includes the coding and decoding information corresponding to the target image block, and the first associated image blocks include an associated image block 0 and an associated image block 1. A convolution operation is performed on the associated image block 0 and the associated image block 1 by the convolutional layer 0 of the image filtering processor based on a neural network to obtain target fusion data corresponding to the associated image block. As shown in FIG. 13F, the coding and decoding information corresponding to the target image block includes a sequence level quantization parameter, a slice level quantization parameter, a slice level coding type, a block coding type, and a predicted image block corresponding to the target image block.

In operation 102, the computer device can acquire the image distance between the target image block and the first associated image block from the target coding and decoding information. If the image distance does not belong to a specified image distance, it is prohibited to filter the target image block according to the first associated image block; and if the image distance belongs to a specified image distance, the target image block is filtered according to the first associated image block and the target coding and decoding information to obtain a filtered image block corresponding to the target image block. The specified image distance may mean that the temporal layer of the target image block is a specified temporal layer. For example, the specified temporal layer may be a layer of the multiple of 2, a Layer5, or a Layer4 and a Layer5. Or, the specified image distance may mean that the difference between a POC of the target image block and a POC of the first associated image block is a specified count difference. For example, the specified count difference may be 1, 1 and 2, or the like. According to the image distance between the first associated image block and the target image block, the targeted use of the first associated image block may be achieved, thereby further improving the filtering performance of the image block.

Based on the size of the target image block being less than the size of the first associated image block, in operation 102, the computer device can partition the first associated image block to obtain N image subblocks, where N is a positive integer greater than 1, and the target coding and decoding information includes coding and decoding information for the degree of influence of the N image subblocks on the target image block respectively. The sizes of the N image subblocks may be the same or different. For example, as shown in FIG. 8*b*, the computer device can partition the first associated image block into 5 image subblocks, the 5 image subblocks include a gray region and 4 diagonal filling regions in a reference image, and the sizes of the 5 image subblocks are the same. Further, the N image subblocks and the coding and decoding information corresponding to the N image subblocks respectively are inputted into the image filtering processor based on a neural network. The computer device can filter the target image block according to the N image subblocks and the coding and decoding information corresponding to the N image subblocks respectively by the image filtering processor based on a neural network to obtain a filtered image block corresponding to the target image block. By introducing associated image blocks in larger regions, more amount of information is provided for the coding process of the target image block, thereby increasing the filtering accuracy of the target image block.

Based on the filtered image block corresponding to the target image block being acquired, the computer device can generate a second associated image block for decoding a predicted image block in the multimedia data according to the filtered image block corresponding to the target image block; and store the second associated image block in a decoding cache. Or, the computer device can generate a display image block according to the filtered image block corresponding to the target image block, skip storing the filtered image block corresponding to the target image block in a decoding cache, and transmit the display image block to a display device which is configured to display the display image block.

Figure 13G:
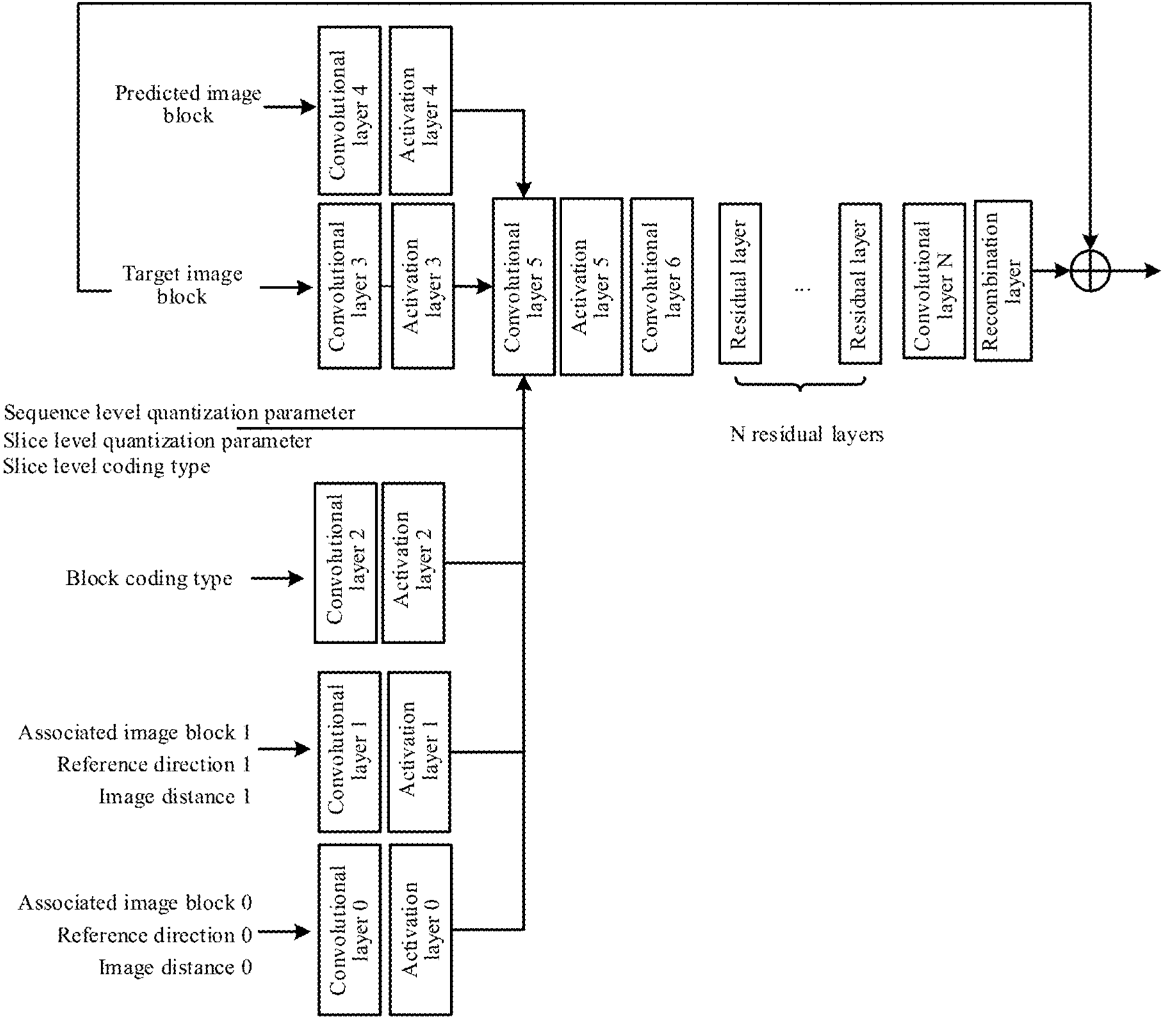
FIG. 13G is a still further schematic diagram of filtering a target image block by an image filtering processor based on a neural network according to some embodiments.

As shown in FIG. 13G, the image filtering processor based on a neural network includes at least two convolutional layers, N Resblock layers, a plurality of activation layers, and a shuffle layer, where the at least two convolutional layers are respectively marked as a convolutional layer 0, a convolutional layer 1, a convolutional layer 2, a convolutional layer 3, . . . , and a convolutional layer N; and the activation layers include an activation layer 0, an activation layer 1, an activation layer 2, . . . . Based on the target coding and decoding information including the coding and decoding information corresponding to the first associated image block and the coding and decoding information corresponding to the target image block, the first associated image blocks include an associated image block 0 and an associated image block 1, the coding and decoding information corresponding to the associated image block 0 is coding and decoding information 0, and the coding and decoding information corresponding to the associated image block 1 is coding and decoding information 1. The coding and decoding information 1 includes an image distance 1 between the associated image block 1 and the target image block, and a reference direction 1 of the associated image block 1 relative to the target image block; and the coding and decoding information 0 includes an image distance 0 between the associated image block 0 and the target image block, and a reference direction 0 of the associated image block 0 relative to the target image block. The convolutional layer 0 corresponds to the associated image block 0, and the convolutional layer 1 corresponds to the associated image block 1. The coding and decoding information corresponding to the target image block includes a sequence level quantization parameter, a slice level quantization parameter, a slice level coding type, a block coding type, and a predicted image block corresponding to the target image block. The computer device can input the coding and decoding information corresponding to the target image block as auxiliary information together with the coding and decoding information of the associated image block into the image filtering processor based on a neural network. FIG. 13G shows an example in which an associated image block 0, a reference direction 0 and an image distance 0 are respectively represented by matrices, and a convolution operation is performed on the matrix corresponding to the associated image block 0, the matrix corresponding to the reference direction 0, and the matrix corresponding to the image distance 0 by a convolutional layer 0 to obtain fusion data corresponding to the associated image block 0. An associated image block 1, a reference direction 1 and an image distance 1 are respectively represented by matrices, and a convolution operation is performed on the matrix corresponding to the associated image block 1, the matrix corresponding to the reference direction 1, and the matrix corresponding to the image distance 1 by a convolutional layer 1 to obtain fusion data corresponding to the associated image block 1. The fusion data corresponding to the associated image block 1 and the fusion data corresponding to the associated image block 0 are determined as target fusion data corresponding to the associated image block. Furthermore, a sequence level quantization parameter, a slice level quantization parameter, a slice level coding type, a block coding type, and a predicted image block corresponding to the target image block are respectively represented by matrices and are inputted into the image filtering processor based on a neural network, and the target image block is filtered based on the foregoing target fusion data and target coding and decoding information by the image filtering processor to obtain a filtered image block corresponding to the target image block.

Based on the image to which the target image block belongs being an I-frame, the matrix with all elements being 0 is determined as a matrix corresponding to the slice coding type corresponding to the target image block. Based on the image to which the target image block belongs being a B-frame or a P-frame, the matrix with all elements being 1 is determined as a matrix corresponding to the slice coding type corresponding to the target image block. The matrix corresponding to the block coding type of the target image block can be filled element by element according to the coding mode of a CU. If the CU belongs to an intraframe coding mode, 0 is assigned to the element corresponding to the CU, otherwise, 1 is assigned to the element corresponding to the CU. Based on the image to which the target image block belongs being an I-frame, the associated image block 0 and the associated image block 1 can be filled with the target image block, and the image distance 1 and the image distance 0 can be set as the minimum weight 0 to obtain the matrix corresponding to the image distance 1 and the matrix corresponding to the image distance 0. If the image to which the target image block belongs is a B-frame or a P-frame, the image distance 1 is set as (1025—the absolute value of the difference between the POC of the associated image block 1 and the POC of the target image block)/1024 to obtain the matrix corresponding to the image distance 1, and the image distance 0 is set as (1025—the absolute value of the difference between the POC of the associated image block 0 and the POC of the target image block)/1024 to obtain the matrix corresponding to the image distance 0. Based on the image to which the target image block belongs being an I-frame, both the direction values (for example elements of matrices) corresponding to the reference direction 0 and the reference direction 1 are set as 0. Based on the image to which the target image block belongs being a B-frame or a P-frame, the POC of the image to which the associated image block 0 belongs is less than the POC of the image to which the target image block belongs, the direction value of the reference direction 0 is set as 0, otherwise, the direction value of the reference direction 0 is set as 1; and the POC of the image to which the associated image block 1 belongs is less than the POC of the image to which the target image block belongs, the direction value of the reference direction 1 is set as 0, otherwise, the direction value of the reference direction 1 is set as 1. Based on the image to which the target image block belongs being a B-frame or a P-frame, the associated image block 0 may be acquired from the first reference frame in a reference frame list in the direction L0, and the associated image block 1 may be acquired from the first reference frame in a reference frame list in the direction L1. The associated image block 0 and the associated image block 1 both have the same spatial positional relationship with the target image block, and the size of the associated image block 0 and the size of the associated image block 1 are both the same as the size of the target image block. By the foregoing processing mode, the I-frame, the B-frame and the P-frame can share the foregoing image filtering processor based on a neural network for filtering, and there may be no need to respectively train an image filtering processor based on a neural network for the I-frame, the B-frame and the P-frame, so that resources can be saved, and the universality of the image filtering processor based on a neural network can be increased.

In some embodiments, the first associated image block associated with the target image block to be filtered in the multimedia data is determined, the target coding and decoding information of the first associated image block associated with the target image block is acquired, and the target image block is filtered according to the target coding and decoding information and the first associated image block to obtain the filtered image block corresponding to the target image block. By introducing the associated image block and multi-dimension information such as the target coding and decoding information, a richer amount of information is provided for the filtering process of the target image block. Furthermore, the target coding and decoding information is configured for reflecting the degree of influence of the first associated image block on the target image block. The use of the target coding and decoding information and the image filtering processor based on a neural network may utilize the quality of the associated image block to filter a reconstructed image block, and may differentially use the associated image block in the filtering process of the target image block, to increase the filtering accuracy of the target image block and improve the filtering quality of the target image block, thus increasing the filtering accuracy of images, improving the filtering effect of images, and further improving the coding quality of multimedia data.

Figure 14:
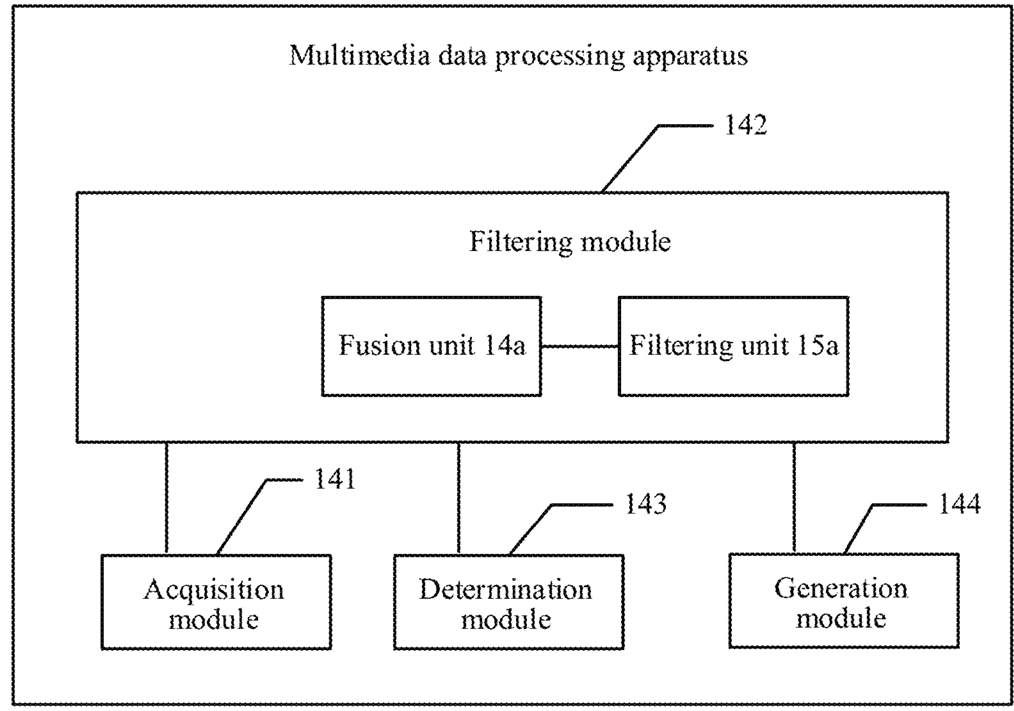
FIG. 14 is a schematic structural diagram of a multimedia data processing apparatus according to some embodiments.

Referring to FIG. 14, FIG. 14 is a schematic structural diagram of a multimedia data processing apparatus provided in some embodiments. The multimedia data processing apparatus may be a computer program (including a program code) running in a computer device. For example, the multimedia data processing apparatus is application software. The apparatus may be configured to execute the corresponding operations in the methods provided in some embodiments. As shown in FIG. 14, the multimedia data processing apparatus may include: an acquisition module 141, a filtering module 142, a determination module 143, and a generation module 144.

The determination module is configured to determine a first associated image block associated with a target image block to be filtered in multimedia data; the acquisition module is configured to acquire target coding and decoding information associated with the target image block; and the filtering module is configured to filter the target image block by an image filtering processor based on a neural network according to the first associated image block and the target coding and decoding information to obtain a filtered image block corresponding to the target image block.

The filtering module includes a fusion unit 14*a* and a filtering unit 15*a*. The fusion unit is configured to fuse the first associated image block with the coding and decoding information corresponding to the first associated image block by an information fusion layer of the image filtering processor based on a neural network to obtain target fusion data corresponding to the first associated image block; and the filtering unit is configured to filter the target image block according to the target fusion data corresponding to the first associated image block by a filtering layer of the image filtering processor based on a neural network to obtain a filtered image block corresponding to the target image block.

The fusion unit is configured to fuse the first associated image block with the coding and decoding information corresponding to the first associated image block by an information fusion layer of the image filtering processor based on a neural network to obtain target fusion data corresponding to the first associated image block; and the filtering unit is configured to filter the target image block according to the target fusion data corresponding to the first associated image block and the coding and decoding information corresponding to the target image block by a filtering layer of the image filtering processor based on a neural network to obtain a filtered image block corresponding to the target image block.

The number of the first associated image block is M, and M is an integer greater than or equal to 1. The image filtering processor based on a neural network includes M information fusion layers, and one information fusion layer corresponds to one associated image block. The fusion unit fuses the first associated image block with the coding and decoding information corresponding to the first associated image block by an information fusion layer of the image filtering processor based on a neural network to obtain target fusion data corresponding to the first associated image block, including the following operations: perform a convolution operation on a first associated image block i and the coding and decoding information corresponding to the first associated image block i by an information fusion layer of the image filtering processor based on a neural network to obtain fusion data corresponding to the first associated image block i, where the first associated image block i belongs to M first associated image blocks, and i is a positive integer less than or equal to M; and determine the fusion data corresponding to the M first associated image blocks respectively as target fusion data corresponding to the first associated image block if the fusion data corresponding to the M first associated image blocks respectively is acquired.

The number of the first associated image block is M, and M is an integer greater than or equal to 1. The fusion unit fuses the first associated image block with the coding and decoding information corresponding to the first associated image block by an information fusion layer of the image filtering processor based on a neural network to obtain target fusion data corresponding to the first associated image block, including the following operation: perform a convolution operation on M first associated image blocks and coding and decoding information by an information fusion layer of the image filtering processor based on a neural network to obtain target fusion data corresponding to the first associated image block.

The number of the first associated image block is M, and M is an integer greater than or equal to 1. The fusion unit fuses the first associated image block with the coding and decoding information corresponding to the first associated image block by an information fusion layer of the image filtering processor based on a neural network to obtain target fusion data corresponding to the first associated image block, including the following operations: perform a point multiplication operation on a first associated image block i and the coding and decoding information corresponding to the first associated image block i by an information fusion layer of the image filtering processor based on a neural network to obtain fusion data corresponding to the first associated image block i, where the first associated image block i belongs to M first associated image blocks, and i is a positive integer less than or equal to M; and perform a convolution operation on the fusion data corresponding to the M first associated image blocks respectively to obtain target fusion data corresponding to the first associated image block if the fusion data corresponding to the M first associated image blocks respectively is acquired.

The coding and decoding information corresponding to the target image block includes at least one of a sequence level quantization parameter, a slice level quantization parameter, a slice level coding type, a block coding type, a filtering enhanced image corresponding to the target image block, predicted image block information corresponding to the target image block, and partitioned image block information of the target image block. The image block information corresponding to the target image block includes at least one of first color component information, second color component information, and third color component information, where the first color component information is configured for reflecting the brightness of an image block, the second color component information and the third color component information are configured for reflecting the chrominance of an image block, and the image block information corresponding to the target image block includes any one of the filtering intensity image block information, the partitioned image block information, and the predicted image block information corresponding to the target image block.

The target coding and decoding information is configured for reflecting the degree of influence of the first associated image block on the target image block. The target coding and decoding information includes at least one of an influence factor of the first associated image block on the target image block, a reference direction of the first associated image block relative to the target image block, partitioned image block information of the first associated image block, a quantization parameter corresponding to the first associated image block, reconstructed image block information corresponding to the first associated image block, filtering intensity image block information corresponding to the first associated image block, and predicted image block information corresponding to the first associated image block, where the influence factor is determined according to an image distance between the first associated image block and the target image block.

The determination module is configured to determine the image distance between the first associated image block and the target image block according to a picture order count (POC) corresponding to the first associated image block and a POC corresponding to the target image block if the slice in which the target image block is located is a non-full intraframe coding slice; and determine a preset value as the image distance between the first associated image block and the target image block if the slice in which the target image block is located is a full intraframe coding slice.

The determination module determines the image distance between the first associated image block and the target image block according to a POC corresponding to the first associated image block and a POC corresponding to the target image block, including the following operations: determine a count difference between the POC corresponding to the first associated image block and the POC corresponding to the target image block; and determine an absolute value of the count difference as the image distance between the first associated image block and the target image block.

The determination module determines the image distance between the first associated image block and the target image block according to a POC corresponding to the first associated image block and a POC corresponding to the target image block, including the following operations: determine a count difference between the POC corresponding to the first associated image block and the POC corresponding to the target image block; and compute a count mapping value corresponding to an absolute value of the count difference, and determine the image distance between the first associated image block and the target image block according to the count mapping value.

The image distance between the first associated image block and the target image block is determined according to a temporal layer of the target image block; or the image distance between the first associated image block and the target image block is determined according to a layer mapping value corresponding to a temporal layer of the target image block.

The image block information corresponding to the first associated image block includes at least one of first color component information, second color component information, and third color component information, where the first color component information is configured for reflecting the brightness of an image block, the second color component information and the third color component information are configured for reflecting the chrominance of an image block, and the image block information corresponding to the first associated image block includes any one of the reconstructed image block information, the partitioned image block information, the filtering intensity image block information, and the predicted image block information corresponding to the first associated image block.

The determination module is further configured to determine a reference direction of the first associated image block relative to the target image block according to the size relationship between a POC corresponding to the first associated image block and a POC corresponding to the target image block if the slice in which the target image block is located is a non-full intraframe coding slice; and indicate a reference direction of the first associated image block relative to the target image block by using a preset direction value if the slice in which the target image block is located is a full intraframe coding slice.

The filtering module filters the target image block by an image filtering processor based on a neural network according to the first associated image block and the target coding and decoding information to obtain a filtered image block corresponding to the target image block, including the following operations: acquire an image distance between the target image block and the first associated image block from the target coding and decoding information; prohibit filtering the target image block according to the first associated image block if the image distance is greater than a distance threshold; and filter the target image block by an image filtering processor based on a neural network according to the first associated image block and the target coding and decoding information to obtain a filtered image block corresponding to the target image block if the image distance is less than or equal to the distance threshold.

The filtering module filters the target image block by an image filtering processor based on a neural network according to the first associated image block and the target coding and decoding information to obtain a filtered image block corresponding to the target image block, including the following operations: acquire an image distance between the target image block and the first associated image block from the target coding and decoding information; prohibit filtering the target image block according to the first associated image block if the image distance does not belong to a specified image distance; and filter the target image block by an image filtering processor based on a neural network according to the first associated image block and the target coding and decoding information to obtain a filtered image block corresponding to the target image block if the image distance belongs to a specified image distance.

The size of the target image block is the same as the size of the first associated image block, or the size of the target image block is different from the size of the first associated image block, where the target image block and the first associated image block have the same spatial positional relationship.

The size of the target image block is the same as the size of the first associated image block, or the size of the target image block is different from the size of the first associated image block, where the target image block and the first associated image block have different spatial positional relationships, and the first associated image block is determined according to a motion vector of the target image block.

Based on the size of the target image block being less than the size of the first associated image block, the filtering module filters the target image block according to the first associated image block and the target coding and decoding information to obtain a filtered image block corresponding to the target image block, including the following operations: partition the first associated image block to obtain N image subblocks, where N is a positive integer greater than 1, and the target coding and decoding information includes coding and decoding information for the degree of influence of the N image subblocks on the target image block respectively; input the N image subblocks and the coding and decoding information corresponding to the N image subblocks respectively into an image filtering processor based on a neural network; and filter the target image block according to the N image subblocks and the coding and decoding information corresponding to the N image subblocks respectively by the image filtering processor based on a neural network to obtain a filtered image block corresponding to the target image block.

The generation module is configured to generate a second associated image block for decoding a predicted image block in the multimedia data according to the filtered image block corresponding to the target image block; store the second associated image block in a decoding cache; or generate a display image block according to the filtered image block corresponding to the target image block, skip storing the filtered image block corresponding to the target image block in a decoding cache, and transmit the display image block to a display device which is configured to display the display image block.

According to some embodiments, each module or unit may exist respectively or be combined into one or more units. Some units may be further split into multiple smaller function subunits, thereby implementing the same operations without affecting the technical effects of some embodiments. The units are divided based on logical functions. In actual applications, a function of one unit may be realized by multiple units, or functions of multiple units may be realized by one unit. In some embodiments, the apparatus may further include other units. In actual applications, these functions may also be realized cooperatively by the other units, and may be realized cooperatively by multiple units.

A person skilled in the art would understand that these "modules" or "units" could be implemented by hardware logic, a processor or processors executing computer software code, or a combination of both. The "modules" or "units" may also be implemented in software stored in a memory of a computer or a non-transitory computer-readable medium, where the instructions of each unit are executable by a processor to thereby cause the processor to perform the respective operations of the corresponding unit.

In some embodiments, the first associated image block associated with the target image block to be filtered in the multimedia data is determined, the target coding and decoding information of the first associated image block associated with the target image block is acquired, and the target image block is filtered according to the target coding and decoding information and the first associated image block to obtain the filtered image block corresponding to the target image block. By introducing the associated image block and multi-dimension information such as the target coding and decoding information, a richer amount of information is provided for the filtering process of the target image block. Furthermore, the target coding and decoding information is configured for reflecting the degree of influence of the first associated image block on the target image block. The use of the target coding and decoding information may utilize the quality of the associated image block to filter a reconstructed image block, and may differentially use the associated image block in the filtering process of the target image block, to increase the filtering accuracy of the target image block and improve the filtering quality of the target image block, thus increasing the filtering accuracy of images, improving the filtering effect of images, and further improving the coding quality of multimedia data.

Figure 15:
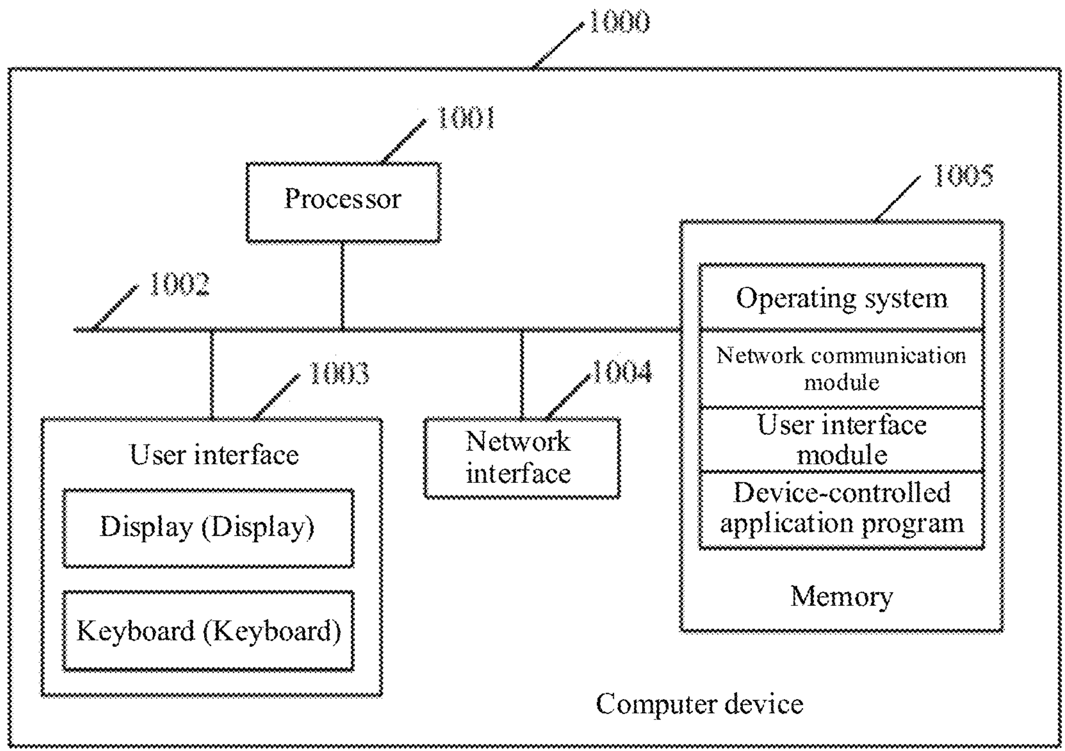
FIG. 15 is a schematic structural diagram of a computer device provided in some embodiments.

Referring to FIG. 15, FIG. 15 is a schematic structural diagram of a computer device provided in some embodiments. As shown in FIG. 15, a computer device 1000 may include: a processor 1001, a network interface 1004 and a memory 1005. In addition, the computer device 1000 may further include: a user interface 1003 and at least one communication bus 1002. The communication bus 1002 is configured to implement connection and communication between these components. The user interface 1003 may include a display and a keyboard. In some embodiments, the user interface 1003 may further include a standard wired interface and a standard wireless interface. In some embodiments, the network interface 1004 may include a standard wired interface and a standard wireless interface (for example, a WI-FI interface). The memory 1005 may be a high-speed random access memory (RAM), or may be a non-volatile memory, for example, at least one magnetic disk storage. In some embodiments, the memory 1005 may also be at least one storage apparatus that is located far away from the foregoing processor 1001. As shown in FIG. 15, the memory 1005 used as a computer-readable storage medium may include an operating system, a network communication module, a network interface module, and a device-controlled application program.

In the computer device 1000 shown in FIG. 15, the network interface 1004 may provide a network communication function; and the user interface 1003 is configured to provide an input interface for media content.

The processor 1001 may be configured to call a device-limited application program stored in the memory 1005 to:

determine a first associated image block associated with a target image block to be filtered in multimedia data;

acquire target coding and decoding information of the first associated image block associated with the target image block; and filter the target image block by an image filtering processor based on a neural network according to the first associated image block and the target coding and decoding information to obtain a filtered image block corresponding to the target image block.

The processor 1001 may be configured to call a device-limited application program stored in the memory 1005 to filter the target image block by an image filtering processor based on a neural network according to the first associated image block and the target coding and decoding information to obtain a filtered image block corresponding to the target image block, including the following operations:

fuse the first associated image block with the coding and decoding information corresponding to the first associated image block by an information fusion layer of the image filtering processor based on a neural network to obtain target fusion data corresponding to the first associated image block; and filter the target image block according to the target fusion data corresponding to the first associated image block by a filtering layer of the image filtering processor based on a neural network to obtain a filtered image block corresponding to the target image block.

The processor 1001 may be configured to call a device-limited application program stored in the memory 1005 to filter the target image block by an image filtering processor based on a neural network according to the first associated image block and the target coding and decoding information to obtain a filtered image block corresponding to the target image block, including the following operations:

fuse the first associated image block with the coding and decoding information corresponding to the first associated image block by an information fusion layer of the image filtering processor based on a neural network to obtain target fusion data corresponding to the first associated image block; and filter the target image block according to the target fusion data corresponding to the first associated image block and the coding and decoding information corresponding to the target image block by a filtering layer of the image filtering processor based on a neural network to obtain a filtered image block corresponding to the target image block.

The number of the first associated image block is M, and M is an integer greater than or equal to 1. The image filtering processor based on a neural network includes M information fusion layers, and one information fusion layer corresponds to one associated image block.

The processor 1001 may be configured to call a device-limited application program stored in the memory 1005 to fuse the first associated image block with the coding and decoding information corresponding to the first associated image block by an information fusion layer of the image filtering processor based on a neural network to obtain target fusion data corresponding to the first associated image block, including the following operations:

perform a convolution operation on a first associated image block i and the coding and decoding information corresponding to the first associated image block i by an information fusion layer i of the image filtering processor based on a neural network to obtain fusion data corresponding to the first associated image block i, where the first associated image block i belongs to M first associated image blocks, and i is a positive integer less than or equal to M; the information fusion layer i is an information fusion layer corresponding to the first associated image block i in the M information fusion layers; and determine the fusion data corresponding to the M first associated image blocks respectively as target fusion data corresponding to the first associated image block if the fusion data corresponding to the M first associated image blocks respectively is acquired.

The number of the first associated image block is M, and M is an integer greater than or equal to 1.

The processor 1001 may be configured to call a device-limited application program stored in the memory 1005 to fuse the first associated image block with the coding and decoding information corresponding to the first associated image block by an information fusion layer of the image filtering processor based on a neural network to obtain target fusion data corresponding to the first associated image block, including the following operation:

perform a convolution operation on M first associated image blocks and coding and decoding information by an information fusion layer of the image filtering processor based on a neural network to obtain target fusion data corresponding to the first associated image block.

The number of the first associated image block is M, and M is an integer greater than or equal to 1. The image filtering processor based on a neural network includes M information fusion layers, and one information fusion layer corresponds to one associated image block.

The processor 1001 may be configured to call a device-limited application program stored in the memory 1005 to fuse the first associated image block with the coding and decoding information corresponding to the first associated image block by an information fusion layer of the image filtering processor based on a neural network to obtain target fusion data corresponding to the first associated image block, including the following operations:

perform a point multiplication operation on a first associated image block i and the coding and decoding information corresponding to the first associated image block i by an information fusion layer i of the image filtering processor based on a neural network to obtain fusion data corresponding to the first associated image block i, where the first associated image block i belongs to M first associated image blocks, and i is a positive integer less than or equal to M; the information fusion layer i is an information fusion layer corresponding to the first associated image block i in the M information fusion layers; and perform a convolution operation on the fusion data corresponding to the M first associated image blocks respectively to obtain target fusion data corresponding to the first associated image block if the fusion data corresponding to the M first associated image blocks respectively is acquired.

The coding and decoding information corresponding to the target image block includes at least one of a sequence level quantization parameter, a slice level quantization parameter, a slice level coding type, a block coding type, filtering intensity image block information corresponding to the target image block, predicted image block information corresponding to the target image block, and partitioned image block information of the target image block.

The image block information corresponding to the target image block includes at least one of first color component information, second color component information, and third color component information, where the first color component information is configured for reflecting the brightness of an image block, the second color component information and the third color component information are configured for reflecting the chrominance of an image block, and the image block information corresponding to the target image block includes any one of the filtering intensity image block information, the partitioned image block information, and the predicted image block information corresponding to the target image block.

The target coding and decoding information is configured for reflecting the degree of influence of the first associated image block on the target image block. The target coding and decoding information includes at least one of an influence factor of the first associated image block on the target image block, a reference direction of the first associated image block relative to the target image block, partitioned image block information of the first associated image block, a quantization parameter corresponding to the first associated image block, reconstructed image block information corresponding to the first associated image block, filtering intensity image block information corresponding to the first associated image block, and predicted image block information corresponding to the first associated image block, where the influence factor is determined according to an image distance between the first associated image block and the target image block.

The processor 1001 may be configured to call a device-limited application program stored in the memory 1005 to: determine the image distance between the first associated image block and the target image block according to a POC corresponding to the first associated image block and a POC corresponding to the target image block if the slice in which the target image block is located is a non-full intraframe coding slice; and determine a preset distance value as the image distance between the first associated image block and the target image block if the slice in which the target image block is located is a full intraframe coding slice.

The processor 1001 may be configured to call a device-limited application program stored in the memory 1005 to determine the image distance between the first associated image block and the target image block according to a POC corresponding to the first associated image block and a POC corresponding to the target image block, including the following operations:

determine a count difference between the POC corresponding to the first associated image block and the POC corresponding to the target image block; and determine an absolute value of the count difference as the image distance between the first associated image block and the target image block.

The processor 1001 may be configured to call a device-limited application program stored in the memory 1005 to determine the image distance between the first associated image block and the target image block according to a POC corresponding to the first associated image block and a POC corresponding to the target image block, including the following operations:

determine a count difference between the POC corresponding to the first associated image block and the POC corresponding to the target image block; and compute a count mapping value corresponding to an absolute value of the count difference, and determine the image distance between the first associated image block and the target image block according to the count mapping value.

The image distance between the first associated image block and the target image block is determined according to a temporal layer of the target image block; or the image distance between the first associated image block and the target image block is determined according to a layer mapping value corresponding to a temporal layer of the target image block.

The image block information corresponding to the first associated image block includes at least one of first color component information, second color component information, and third color component information, where the first color component information is configured for reflecting the brightness of an image block, the second color component information and the third color component information are configured for reflecting the chrominance of an image block, and the image block information corresponding to the first associated image block includes any one of the reconstructed image block information, the partitioned image block information, the filtering intensity image block information, and the predicted image block information corresponding to the first associated image block.

The processor 1001 may be configured to call a device-limited application program stored in the memory 1005 to: determine a reference direction of the first associated image block relative to the target image block according to the size relationship between a POC corresponding to the first associated image block and a POC corresponding to the target image block if the slice in which the target image block is located is a non-full intraframe coding slice; and indicate a reference direction of the first associated image block relative to the target image block by using a preset direction value if the slice in which the target image block is located is a full intraframe coding slice.

The processor 1001 may be configured to call a device-limited application program stored in the memory 1005 to filter the target image block by an image filtering processor based on a neural network according to the first associated image block and the target coding and decoding information to obtain a filtered image block corresponding to the target image block, including the following operations:

acquire an image distance between the target image block and the first associated image block from the target coding and decoding information;

prohibit filtering the target image block according to the first associated image block if the image distance is greater than a distance threshold; and filter the target image block by an image filtering processor based on a neural network according to the first associated image block and the target coding and decoding information to obtain a filtered image block corresponding to the target image block if the image distance is less than or equal to the distance threshold.

The processor 1001 may be configured to call a device-limited application program stored in the memory 1005 to filter the target image block by an image filtering processor based on a neural network according to the first associated image block and the target coding and decoding information to obtain a filtered image block corresponding to the target image block, including the following operations:

acquire an image distance between the target image block and the first associated image block from the target coding and decoding information;

prohibit filtering the target image block according to the first associated image block if the image distance does not belong to a specified image distance; and filter the target image block by an image filtering processor based on a neural network according to the first associated image block and the target coding and decoding information to obtain a filtered image block corresponding to the target image block if the image distance belongs to a specified image distance.

The size of the target image block is the same as the size of the first associated image block, or the size of the target image block is different from the size of the first associated image block, where the target image block and the first associated image block have the same spatial positional relationship.

The size of the target image block is the same as the size of the first associated image block, or the size of the target image block is different from the size of the first associated image block, where the target image block and the first associated image block have different spatial positional relationships, and the first associated image block is determined according to a motion vector of the target image block.

Based on the size of the target image block being less than the size of the first associated image block, the processor 1001 may be configured to call a device-limited application program stored in the memory 1005 to filter the target image block by an image filtering processor based on a neural network according to the first associated image block and the target coding and decoding information to obtain a filtered image block corresponding to the target image block, including the following operations:

partition the first associated image block to obtain N image subblocks, where Nis a positive integer greater than 1, and the target coding and decoding information includes coding and decoding information for the degree of influence of the N image subblocks on the target image block respectively;

input the N image subblocks and the coding and decoding information corresponding to the N image subblocks respectively into an image filtering processor based on a neural network; and filter the target image block according to the N image subblocks and the coding and decoding information corresponding to the N image subblocks respectively by the image filtering processor based on a neural network to obtain a filtered image block corresponding to the target image block.

The processor 1001 may be configured to call a device-limited application program stored in the memory 1005 to:

generate a second associated image block for decoding a predicted image block in the multimedia data according to the filtered image block corresponding to the target image block; store the second associated image block in a decoding cache; or generate a display image block according to the filtered image block corresponding to the target image block, skip storing the filtered image block corresponding to the target image block in a decoding cache, and transmit the display image block to a display device which is configured to display the display image block.

In some embodiments, the first associated image block associated with the target image block to be filtered in the multimedia data is determined, the target coding and decoding information of the first associated image block for the degree of influence on the target image block is acquired, and the target image block is filtered according to the target coding and decoding information and the first associated image block to obtain the filtered image block corresponding to the target image block. By introducing the associated image block and multi-dimension information such as the target coding and decoding information, a richer amount of information is provided for the filtering process of the target image block. Furthermore, the target coding and decoding information is configured for reflecting the degree of influence of the first associated image block on the target image block. The use of the target coding and decoding information and the image filtering processor based on a neural network may utilize the quality of the associated image block to filter a reconstructed image block, and may differentially use the associated image block in the filtering process of the target image block, to increase the filtering accuracy of the target image block and improve the filtering quality of the target image block, thus increasing the filtering accuracy of images, improving the filtering effect of images, and further improving the coding quality of multimedia data.

The computer device 1000 described in some embodiments may perform the description of the multimedia data processing method in some embodiments corresponding to FIG. 4, and may also perform the description of the multimedia data processing apparatus in some embodiments corresponding to FIG. 14.

In addition, some embodiments provide a computer-readable storage medium, the computer-readable storage medium stores a computer program executed by the foregoing multimedia data processing apparatus, and the computer program includes a program instruction. When executing the program instruction, the foregoing processor may perform the description of the multimedia data processing method in some embodiments corresponding to FIG. 4. For technical details, reference may also be made to the descriptions of the method according to some embodiments.

As an example, the foregoing program instruction may be deployed to be executed on a computer device, or deployed to be executed on at least two computer devices at the same location, or deployed to be executed on at least two computer devices that are distributed at at least two locations and interconnected through a communication network. The at least two computer devices that are distributed at the at least two locations and interconnected through the communication network may form a blockchain network.

The foregoing computer-readable storage medium may be a data processing apparatus provided in any of the foregoing embodiments or an internal storage unit of the foregoing computer device, such as a hard disk or a memory of the computer device. The computer-readable storage medium may also be an external storage device of the computer device, such as a plug-in hard disk, a smart media card (SMC), a secure digital (SD) card, or a flash card equipped on the computer device. Further, the computer-readable storage medium may also include both an internal storage unit of the computer device and an external storage device. The computer-readable storage medium is configured to store the computer program and other programs and data for the computer device. The computer-readable storage medium may also be configured to temporarily store the data that has been outputted or will be outputted.

Some embodiments provide a computer program product, including a computer program/instruction. When executing the computer program/instruction, a processor implements the description of the multimedia data processing method in some embodiments corresponding to FIG. 4. For technical details, reference may also be made to the descriptions of the method according to some embodiments.

The terms "first", "second", and the like, claims or accompanying drawings of some embodiments are configured to distinguish different media contents, rather than configured to describe a specific order. In addition, the terms "include" and any variant thereof are intended to cover a non-exclusive inclusion. For example, a process, method, apparatus, product, or device that includes a series of operations or units is not limited to the listed operations or modules, and may further include an operation or module that is not listed, or may further include another operation or unit that is intrinsic to the process, method, apparatus, product, or device.

A person of ordinary skill in the art may understand that units and algorithm operations of the examples described in the foregoing disclosed embodiments may be implemented by electronic hardware, computer software, or a combination thereof. To clearly describe the interchangeability between the hardware and the software, the foregoing has described compositions and operations of each example based on functions. Whether the functions are executed in a mode of hardware or software depends on particular applications and design constraint conditions of the technical solutions. A person skilled in the art may implement the described functions by different methods for each particular application, but such implementation is not to be considered beyond the scope of the disclosure.

The methods and related apparatuses provided in some embodiments are described with reference to the method flowcharts and/or schematic structural diagrams provided in some embodiments. Each flow and/or block in the method flowcharts and/or schematic structural diagrams and a combination of flows and/or blocks in the flowcharts and/or block diagrams may be implemented according to computer program instructions. These computer program instructions may be provided to a computer, a dedicated computer, an embedded processor, or a processor of another programmable data processing device to generate a machine, so that the instructions executed by the computer or the processor of the another programmable data processing device generate an apparatus for implementing a function in one or more flows in the flowcharts and/or in one or more blocks in the schematic structural diagrams. These computer program instructions may also be stored in a computer-readable memory that can instruct the computer or the another programmable data processing device to work in a mode, so that the instructions stored in the computer-readable memory generate a manufactured product that includes an instruction apparatus. The instruction apparatus implements a function in one or more flows in the flowcharts and/or in one or more blocks in the schematic structural diagrams. These computer program instructions may also be loaded onto the computer or the another programmable data processing device, so that a series of operations are executed on the computer or the another programmable device, thereby generating computer-implemented processing. Therefore, the instructions executed on the computer or the another programmable device provide operations for implementing a function in one or more flows in the flowcharts and/or in one or more blocks in the schematic structural diagrams.

The foregoing embodiments are used for describing, instead of limiting the technical solutions of the disclosure. A person of ordinary skill in the art shall understand that although the disclosure has been described in detail with reference to the foregoing embodiments, modifications can be made to the technical solutions described in the foregoing embodiments, or equivalent replacements can be made to some technical features in the technical solutions, provided that such modifications or replacements do not cause the essence of corresponding technical solutions to depart from the spirit and scope of the technical solutions of the embodiments of the disclosure and the appended claims.

What is claimed is:

1. A multimedia data processing method executed by a computer device, comprising:

determining a first associated image block associated with a target image block to be filtered in multimedia data;

acquiring target coding and decoding information associated with the target image block; and filtering the target image block by:

inputting the target image block, the first associated image block, and the target coding and decoding information into an image filter based on a neural network, wherein the neural network is trained to minimize a loss function measuring a difference between a true value comprising an original image block and a predicted filtered image block output by the image filter based on: (i) an input target image block, (ii) an input associated image block, and (iii) input target coding and decoding information, fusing the first associated image block with first coding and decoding information corresponding to the first associated image block by an information fusion layer of the image filter to obtain target fusion data corresponding to the first associated image block, and filtering the target image block according to the target fusion data by a filtering layer of the image filter to obtain a filtered image block corresponding to the target image block.

2. The method according to claim 1, wherein the filtering the target image block comprises:

fusing the first associated image block with first coding and decoding information corresponding to the first associated image block by an information fusion layer of the image filter to obtain target fusion data corresponding to the first associated image block; and filtering the target image block according to the target fusion data and second coding and decoding information corresponding to the target image block by a filtering layer of the image filter to obtain the filtered image block.

3. The method according to claim 2, wherein the second coding and decoding information comprises at least one of: a sequence level quantization parameter, a slice level quantization parameter, a slice level coding type, a block coding type, filtering intensity image block information corresponding to the target image block, predicted image block information corresponding to the target image block, or partitioned image block information of the target image block.

4. The method according to claim 3, wherein image block information corresponding to the target image block comprises at least one of first color component information, second color component information, or third color component information, wherein the first color component information indicates brightness of an image block, wherein the second color component information and the third color component information indicate chrominance of the image block, and wherein the image block information comprises the filtering intensity image block information, the partitioned image block information, or the predicted image block information.

5. The method according to claim 1, wherein a number of the first associated image block is M, and M is an integer greater than or equal to 1, wherein the image filter comprises M information fusion layers, wherein one information fusion layer corresponds to one associated image block, wherein the fusing the first associated image block comprises:

performing a convolution operation on a first associated image block i and second coding and decoding information corresponding to the first associated image block i by an information fusion layer i of the image filter to obtain first fusion data corresponding to the first associated image block i; and determining second fusion data corresponding to M first associated image blocks respectively as the target fusion data based on the second fusion data being acquired, wherein the first associated image block i belongs to M first associated image blocks, wherein i is a positive integer less than or equal to M, and wherein the information fusion layer i is a first information fusion layer corresponding to the first associated image block i in the M information fusion layers.

6. The method according to claim 1, wherein a number of the first associated image block is M, and M is an integer greater than or equal to 1, and wherein the fusing the first associated image block comprises performing a convolution operation on M first associated image blocks and M coding and decoding information by the information fusion layer to obtain the target fusion data.

7. The method according to claim 1, wherein a number of the first associated image block is M, and M is an integer greater than or equal to 1, wherein the image filter comprises M information fusion layers, wherein one information fusion layer corresponds to one associated image block, wherein the fusing the first associated image block comprises:

performing a point multiplication operation on a first associated image block i and second coding and decoding information corresponding to the first associated image block i by an information fusion layer i of the image filter to obtain first fusion data corresponding to the first associated image block i; and performing a convolution operation on second fusion data corresponding to M first associated image blocks respectively to obtain the target fusion data based on the second fusion data being acquired, wherein the first associated image block i belongs to M first associated image blocks, wherein i is a positive integer less than or equal to M, and wherein the information fusion layer i is a first information fusion layer corresponding to the first associated image block i in the M information fusion layers.

8. The method according to claim 1, wherein the target coding and decoding information indicates a degree of influence of the first associated image block on the target image block, and wherein the target coding and decoding information comprises at least one of an influence factor of the first associated image block on the target image block, a reference direction of the first associated image block relative to the target image block, partitioned image block information of the first associated image block, a quantization parameter corresponding to the first associated image block, reconstructed image block information corresponding to the first associated image block, filtering intensity image block information corresponding to the first associated image block, or predicted image block information corresponding to the first associated image block, and wherein the influence factor is determined according to an image distance between the first associated image block and the target image block.

9. The method according to claim 8, wherein the method further comprises:

determining the image distance between the first associated image block and the target image block according to a picture order count (POC) corresponding to the first associated image block and a POC corresponding to the target image block based on a slice in which the target image block is located being a non-full intraframe coding slice; and determining a preset distance value as the image distance between the first associated image block and the target image block based on the slice in which the target image block is located being a full intraframe coding slice.

10. A multimedia data processing apparatus, comprising:

at least one memory configured to store computer program code; and at least one processor configured to read the program code and operate as instructed by the program code, the program code comprising:

determination code configured to cause at least one of the at least one processor to determine a first associated image block associated with a target image block to be filtered in multimedia data;

acquisition code configured to cause at least one of the at least one processor to acquire target coding and decoding information of the first associated image block associated with the target image block; and first filtering code configured to cause at least one of the at least one processor to filter the target image block by:

inputting the target image block, the first associated image block, and the target coding and decoding information into an image filter based on a neural network, wherein the neural network is trained to minimize a loss function measuring a difference between a true value comprising an original image block and a predicted filtered image block output by the image filter based on: (i) an input target image block, (ii) an input associated image block, and (iii) input target coding and decoding information, fusing the first associated image block with first coding and decoding information corresponding to the first associated image block by an information fusion layer of the image filter to obtain target fusion data corresponding to the first associated image block, and filtering the target image block according to the target fusion data by a filtering layer of the image filter to obtain a filtered image block corresponding to the target image block.

11. The apparatus according to claim 10, wherein the first filtering code comprises first fusing code and second filtering code:

wherein the first fusing code is configured to cause at least one of the at least one processor to fuse the first associated image block with first coding and decoding information corresponding to the first associated image block by an information fusion layer of the image filter to obtain target fusion data corresponding to the first associated image block; and wherein the second filtering code is configured to cause at least one of the at least one processor to filter the target image block according to the target fusion data and second coding and decoding information corresponding to the target image block by a filtering layer of the image filter to obtain the filtered image block.

12. The apparatus according to claim 11, wherein the second coding and decoding information comprises at least one of: a sequence level quantization parameter, a slice level quantization parameter, a slice level coding type, a block coding type, filtering intensity image block information corresponding to the target image block, predicted image block information corresponding to the target image block, or partitioned image block information of the target image block.

13. The apparatus according to claim 12, wherein image block information corresponding to the target image block comprises at least one of first color component information, second color component information, or third color component information, wherein the first color component information indicates brightness of an image block, wherein the second color component information and the third color component information indicate chrominance of the image block, and wherein the image block information comprises the filtering intensity image block information, the partitioned image block information, or the predicted image block information.

14. The apparatus according to claim 10, wherein a number of the first associated image block is M, and M is an integer greater than or equal to 1, wherein the image filter comprises M information fusion layers, wherein one information fusion layer corresponds to one associated image block, wherein the first fusing code is configured to cause at least one of the at least one processor to:

perform a convolution operation on a first associated image block i and second coding and decoding information corresponding to the first associated image block i by an information fusion layer i of the image filter to obtain first fusion data corresponding to the first associated image block i; and determine second fusion data corresponding to M first associated image blocks respectively as the target fusion data based on the second fusion data being acquired, wherein the first associated image block i belongs to M first associated image blocks, wherein i is a positive integer less than or equal to M, and wherein the information fusion layer i is a first information fusion layer corresponding to the first associated image block i in the M information fusion layers.

15. The apparatus according to claim 10, wherein a number of the first associated image block is M, and M is an integer greater than or equal to 1, and wherein the first fusing code is configured to cause at least one of the at least one processor to perform a convolution operation on M first associated image blocks and M coding and decoding information by the information fusion layer to obtain the target fusion data.

16. The apparatus according to claim 10, wherein a number of the first associated image block is M, and M is an integer greater than or equal to 1, wherein the image filter comprises M information fusion layers, wherein one information fusion layer corresponds to one associated image block, wherein the first fusing code is configured to cause at least one of the at least one processor to:

perform a point multiplication operation on a first associated image block i and second coding and decoding information corresponding to the first associated image block i by an information fusion layer i of the image filter to obtain first fusion data corresponding to the first associated image block i; and perform a convolution operation on second fusion data corresponding to M first associated image blocks respectively to obtain the target fusion data based on the second fusion data being acquired, wherein the first associated image block i belongs to M first associated image blocks, wherein i is a positive integer less than or equal to M, and wherein the information fusion layer i is a first information fusion layer corresponding to the first associated image block i in the M information fusion layers.

17. The apparatus according to claim 10, wherein the target coding and decoding information indicates a degree of influence of the first associated image block on the target image block, and wherein the target coding and decoding information comprises at least one of an influence factor of the first associated image block on the target image block, a reference direction of the first associated image block relative to the target image block, partitioned image block information of the first associated image block, a quantization parameter corresponding to the first associated image block, reconstructed image block information corresponding to the first associated image block, filtering intensity image block information corresponding to the first associated image block, or predicted image block information corresponding to the first associated image block, and wherein the influence factor is determined according to an image distance between the first associated image block and the target image block.

18. A non-transitory computer-readable storage medium, storing computer code which, when executed by at least one processor, causes the at least one processor to at least:

determine a first associated image block associated with a target image block to be filtered in multimedia data;

acquire target coding and decoding information of the first associated image block associated with the target image block; and filter the target image block by:

inputting the target image block, the first associated image block, and the target coding and decoding information into an image filter based on a neural network, wherein the neural network is trained to minimize a loss function measuring a difference between a true value comprising an original image block and a predicted filtered image block output by the image filter based on: (i) an input target image block, (ii) an input associated image block, and (iii) input target coding and decoding information, fusing the first associated image block with first coding and decoding information corresponding to the first associated image block by an information fusion layer of the image filter to obtain target fusion data corresponding to the first associated image block, and filtering the target image block according to the target fusion data by a filtering layer of the image filter to obtain a filtered image block corresponding to the target image block.

* * * * *